US012754758B2

(12) United States Patent
(10) Patent No.: US 12,754,758 B2
(45) Date of Patent: Oct. 6, 2026

Venkatarao et al.

(54) ATOMIC DETERMINISTIC NEXT ACTION

(71) Applicant: Boost SubscriberCo L.L.C., Englewood, CO (US)

(72) Inventors: Sharath Venkatarao, Lone Tree, CO (US); Daniel Brian Steeves, Lakewood, CO (US); Sandeep Kulkarni, Centennial, CO (US); James M. Adkins, III, Bennett, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 382 days.

(21) Appl. No.: 18/341,632

(22) Filed: Jun. 26, 2023

(65) Prior Publication Data

US 2024/0143384 A1 May 2, 2024

Related U.S. Application Data

(60) Provisional application No. 63/419,608, filed on Oct. 26, 2022.

(51) Int. Cl.
*G06F 9/46* (2006.01)

(52) U.S. Cl.
CPC .................................... *G06F 9/463* (2013.01)

(58) Field of Classification Search
CPC ... G06F 9/463; H04L 41/082; H04L 41/0894; H04L 41/0895; H04L 41/5019;
(Continued)

(56) References Cited

U.S. PATENT DOCUMENTS 6,490,594 B1 12/2002 Lomet
6,772,333 B1 * 8/2004 Brendel .............. H04L 67/1001 713/153

(Continued)

FOREIGN PATENT DOCUMENTS

EP 3 869 847 A1 8/2021

OTHER PUBLICATIONS

AWS, "5G Network Evolution with AWS—Design scalable, secure, reliable, and cost-efficient cloud-native core and edge network on AWS," Jul. 2020, 48 pages.

(Continued)

*Primary Examiner* — Adam Lee
(74) *Attorney, Agent, or Firm* — Seed Intellectual Property Law Group LLP

(57) ABSTRACT

Methods and apparatuses for providing a dynamically scalable ADNA Manager with decentralized atomic decision making are described. The decentralized atomic decision making may be performed using atomic deterministic next action (ADNA) task blocks that execute one or more workflow rules and then invoke one or more ADNAs within a pool of ADNAs. The ADNA Manager may identify a first ADNA task block, determine a set of input parameters for the first ADNA task block, detect that a first input parameter of the set of input parameters does not satisfy a qualification rule for the first ADNA task block, identify an exception ADNA task block in response to detection that the first input parameter does not satisfy the qualification rule, store breadcrumb information for the first ADNA task block within a persistence layer prior to the exception ADNA task block being invoked, and invoke the exception ADNA task block.

20 Claims, 13 Drawing Sheets

(58) Field of Classification Search
CPC ............. H04L 43/0858; H04L 43/0888; H04L 43/106; H04L 43/16; H04L 43/20; H04L 41/0806
USPC .......................................................... 718/103
See application file for complete search history.

(56) References Cited

U.S. PATENT DOCUMENTS

| | | | | |
|---|---|---|---|---|
| 9,164,159 | B2 | 10/2015 | Nath et al. | |
| 9,781,685 | B2 | 10/2017 | Tsui et al. | |
| 10,178,646 | B2 | 1/2019 | Bosch et al. | |
| 10,230,571 | B2 | 3/2019 | Rangasamy et al. | |
| 10,278,123 | B2 | 4/2019 | Wang et al. | |
| 10,452,372 | B2 | 10/2019 | Lundberg et al. | |
| 10,484,892 | B2 | 11/2019 | Bellamkonda et al. | |
| 10,499,276 | B2 | 12/2019 | Chan et al. | |
| 10,499,376 | B2 | 12/2019 | Kim | |
| 10,656,929 | B2 | 5/2020 | Jamjoom et al. | |
| 10,716,096 | B2 | 7/2020 | Yu et al. | |
| 10,812,377 | B2 | 10/2020 | Stammers et al. | |
| 10,886,976 | B2 | 1/2021 | Rajagopal et al. | |
| 10,904,038 | B1 | 1/2021 | Haque | |
| 10,944,668 | B2 | 3/2021 | Rajagopal et al. | |
| 10,986,540 | B2 | 4/2021 | Bor Yaliniz et al. | |
| 11,019,159 | B2 | 5/2021 | Lawson et al. | |
| 11,128,985 | B2 | 9/2021 | Edge et al. | |
| 11,153,271 | B2 | 10/2021 | Yang et al. | |
| 11,223,994 | B2 | 1/2022 | Yang et al. | |
| 11,228,621 | B2 | 1/2022 | Sharma et al. | |
| 11,240,063 | B2 | 2/2022 | Liu et al. | |
| 11,284,297 | B2 | 3/2022 | Barton et al. | |
| 12,190,104 | B2 * | 1/2025 | Duggal | H04L 67/02 |
| 2002/0120763 | A1 | 8/2002 | Miloushev et al. | |
| 2002/0170053 | A1 | 11/2002 | Peterka et al. | |
| 2006/0085423 | A1 * | 4/2006 | Barsness | H04L 41/5083 |
| 2006/0155905 | A1 * | 7/2006 | Leino | G06F 9/526 710/243 |
| 2007/0206611 | A1 * | 9/2007 | Shokri | H04L 41/0663 714/E11.207 |
| 2008/0320247 | A1 | 12/2008 | Morfey et al. | |
| 2009/0150900 | A1 | 6/2009 | Kowalkiewicz et al. | |
| 2012/0016713 | A1 | 1/2012 | Wilcock et al. | |
| 2015/0109976 | A1 | 4/2015 | Zhang et al. | |
| 2017/0079059 | A1 | 3/2017 | Li et al. | |
| 2018/0049015 | A1 | 2/2018 | Gupta et al. | |
| 2018/0307514 | A1 | 10/2018 | Koutyrine et al. | |
| 2019/0057173 | A1 * | 2/2019 | Ventroux | G06F 30/33 |
| 2019/0220703 | A1 | 7/2019 | Prakash et al. | |
| 2019/0253907 | A1 | 8/2019 | Yao et al. | |
| 2019/0289497 | A1 | 9/2019 | Rajagopal | |
| 2019/0306923 | A1 | 10/2019 | Xiong et al. | |
| 2019/0349429 | A1 | 11/2019 | Jain et al. | |
| 2020/0050494 | A1 | 2/2020 | Bartfai-Walcott et al. | |
| 2020/0084105 | A1 | 3/2020 | Hajost et al. | |
| 2020/0106536 | A1 | 4/2020 | Bedekar | |
| 2020/0125389 | A1 | 4/2020 | Palermo et al. | |
| 2020/0195495 | A1 | 6/2020 | Parker et al. | |
| 2020/0204338 | A1 * | 6/2020 | Bougalis | H04L 9/0643 |
| 2021/0014912 | A1 | 1/2021 | Song et al. | |
| 2021/0081838 | A1 | 3/2021 | Hernández Rincón et al. | |
| 2021/0144517 | A1 | 5/2021 | Guim Bernat et al. | |
| 2021/0144613 | A1 | 5/2021 | Colom Ikuno et al. | |
| 2021/0194821 | A1 | 6/2021 | Guim Bernat et al. | |
| 2021/0204162 | A1 | 7/2021 | Chunduri et al. | |
| 2021/0242893 | A1 | 8/2021 | Goodman et al. | |
| 2021/0258231 | A1 | 8/2021 | Venkataramu et al. | |
| 2021/0258836 | A1 | 8/2021 | Faccin et al. | |
| 2021/0306874 | A1 | 9/2021 | Bedekar | |
| 2021/0314842 | A1 | 10/2021 | Padlikar et al. | |
| 2021/0351989 | A1 | 11/2021 | Toy | |
| 2021/0377116 | A1 | 12/2021 | Yeh et al. | |
| 2022/0035650 | A1 | 2/2022 | Banerjee et al. | |
| 2022/0070734 | A1 | 3/2022 | Rajagopal | |
| 2022/0131847 | A1 | 4/2022 | Shiner et al. | |
| 2022/0141715 | A1 | 5/2022 | Mayor et al. | |
| 2022/0374320 | A1 * | 11/2022 | Song | G06F 11/2048 |
| 2023/0141037 | A1 * | 5/2023 | Ghoddoosian | G06V 20/49 382/103 |
| 2024/0147259 | A1 * | 5/2024 | Venkatarao | H04L 41/0895 |
| 2024/0147261 | A1 * | 5/2024 | Venkatarao | G06F 9/4881 |
| 2024/0184618 | A1 | 6/2024 | Jasionowski et al. | |

OTHER PUBLICATIONS

AWS, "Deploying E2E 5G Network with AWS—5G RAN, Edge, Core, and Data Network," 2020, 1 page.

AWS, "Continuous Integration and Continuous Delivery for 5G Networks on AWS," AWS Whitepaper, 2021, 31 pages.

AWS, "Cloud Automation for 5G Network," Jun. 16, 2021, 22 pages.

AWS, "Next-Generation Mobile Private Networks Powered by AWS," AWS Whitepaper, 2021, 29 pages.

AWS, "Amazon EC2 Overview and Networking Introduction for Telecom Companies," 2019, 27 pages.

Bye et al., "Reinventing cloud-native 5G networks," AWS telecom and Dish, 2021, 11 pages.

"Comments on 5G Americas," In the Matter of Promoting the Deployment of 5G Open Radio Access Networks, before the Federal Communications Commission, Washington, D.C., 20554, 2021, 60 pages.

Dish Wireless, "Dish Lays the foundation for 5G network security," White Paper, 2021, 12 pages.

Dish Wireless, "Dish Wireless Future of the Connected Vehicle," 2022, 22 pages.

Maule et al., "Real-time Dynamic Network Slicing for the 5G Radio Access Network," IEEE, 2019, 6 pages.

* cited by examiner

ATOMIC DETERMINISTIC NEXT ACTION

BACKGROUND

Fifth generation (5G) mobile networks have the promise to provide higher throughput, lower latency, and higher availability compared with previous global wireless standards. A combination of control and user plane separation (CUPS) and multi-access edge computing (MEC), which allows compute and storage resources to be moved from a centralized cloud location to the "edge" of a network and closer to end user devices and equipment, may enable low-latency applications with millisecond response times. 5G networks may leverage the use of cyclic prefix orthogonal frequency-division multiplexing (CP-OFDM) to increase channel utilization and reduce interference, the use of multiple-input multiple-output (MIMO) antennas to increase spectral efficiency, and the use of millimeter wave spectrum (mmWave) operation to increase throughput and reduce latency in data transmission. 5G wireless user equipment (UE) may communicate over both a lower frequency sub-6 GHz band between 410 MHz and 7125 MHz and a higher frequency mmWave band between 24.25 GHz and 52.6 GHz. In general, although lower frequencies may provide a lower maximum bandwidth and lower data rates than higher frequencies, lower frequencies may provide higher spectral efficiency and greater range. Thus, there is a tradeoff between coverage and speed. For example, although the mmWave spectrum may provide higher data rates, the millimeter waves may not penetrate through objects, such as walls and glass, and may have a more limited range.

BRIEF SUMMARY

Systems and methods for executing workflow processes with decentralized atomic decision making are provided. The decentralized atomic decision making may be performed using "fire and forget" atomic deterministic next action (ADNA) task blocks that execute one or more workflow rules and then invoke one or more other ADNAs within a pool of ADNAs managed by a system. An ADNA (or ADNA task block) may invoke one or more other ADNAs without requiring a request-response pattern when communicating with the one or more other ADNAs.

In some embodiments, an ADNA Manager may be utilized to orchestrate the execution of a workflow process that includes sub-processes and/or tasks without a fixed orchestration. In this case, the total number of sub-processes and/or tasks for the workflow process may be unknown until runtime of the workflow process. The ADNA Manager may identify a first ADNA task block out of a pool of ADNA task blocks managed by the ADNA Manager, identify a set of input parameters for the first ADNA task block based on the workflow process, detect that a first input parameter of the set of input parameters does not satisfy a qualification rule for the first ADNA task block, identify an exception ADNA task block out of the pool of ADNA task blocks in response to detection that the first input parameter does not satisfy the qualification rule, store breadcrumb information for the first ADNA task block within a persistence layer prior to the exception ADNA task block being invoked, and invoke the exception ADNA task block. The breadcrumb information for the first ADNA task block may include a timestamp for when the first ADNA task block invoked the exception ADNA task block, an identification of the first ADNA task block, and an identification of the exception ADNA task block.

According to some embodiments, the technical benefits of the systems and methods disclosed herein include improved system performance, fault tolerance, and load balancing. Furthermore, the number of request-response transactions between tasks managed by the ADNA Manager may be eliminated or reduced, thereby reducing system power and energy consumption.

BRIEF DESCRIPTION OF THE DRAWINGS

Like-numbered elements may refer to common components in the different figures.

DETAILED DESCRIPTION

Figure 1A:
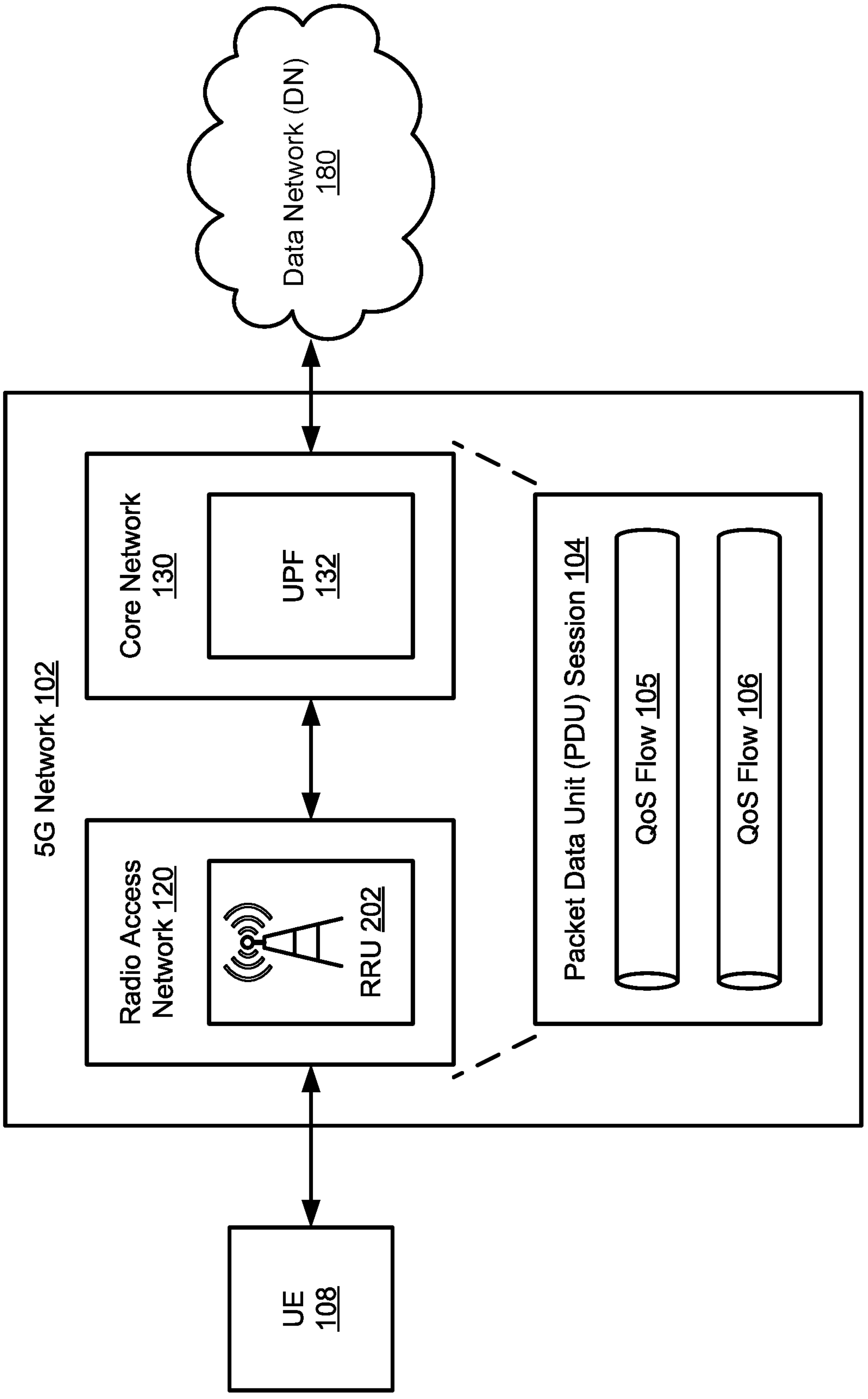
FIG. 1A depicts an embodiment of a 5G network including a radio access network (RAN) and a core network.

Technology is described for providing a dynamically scalable ADNA Manager with decentralized atomic decision making. The ADNA Manager may orchestrate the execution of processes that include sub-processes and/or tasks without a fixed orchestration such that the number of sub-processes and/or tasks is not determined until runtime. A process (e.g., a workflow process) may comprise a set of sub-processes and/or tasks that need to be performed to complete the process. In some cases, a task may comprise an atomic activity, while a sub-process may comprise a non-atomic activity. A task may comprise a lowest-level process that cannot be broken down to a finer level of detail. Decentralized atomic decision making may be performed using atomic deterministic next action (ADNA) task blocks that execute one or more workflow rules and then call or invoke one or more ADNAs within a pool of ADNAs managed by the ADNA Manager. Over time, ADNAs may be added to and removed from the pool of ADNAs by the ADNA Manager. Each ADNA in the pool of ADNAs may reference or point to one or more other ADNAs within the pool of ADNAs as next action ADNAs. Each ADNA may comprise an API or an interface specification for interfacing with the ADNA, one or more workflow rules to be performed by the ADNA, and a mapping of one or more next actions to one or more other ADNAs within the pool of ADNAs. Each ADNA in the pool of ADNAs may store state information, transaction information, and data processing information within a persistence layer or within a persistent storage layer. The persistent storage layer may comprise nonvolatile data storage.

Technical benefits of utilizing a ADNA Manager with decentralized atomic decision making include improved system scalability and a reduction in the number of transactions between operations and/or tasks executed by the ADNA Manager. Moreover, technical benefits of using exception ADNAs to remediate data or perform exception handling for input parameters that do not satisfy qualification rules include improved system performance and reduced system downtime.

In some embodiments, the ADNA Manager may identify a first ADNA task block out of a pool of ADNA task blocks managed by the ADNA Manager, determine a set of input parameters for the first ADNA task block, detect that a first input parameter of the set of input parameters does not satisfy a qualification rule for the first ADNA task block, identify an exception ADNA task block out of the pool of ADNA task blocks in response to detection that the first input parameter does not satisfy the qualification rule, store breadcrumb information for the first ADNA task block within a persistence layer prior to the exception ADNA task block being invoked, and invoke the exception ADNA task block. Subsequently, the exception ADNA task block may acquire or determine an updated input parameter for the first input parameter and invoke the first ADNA task block from the exception ADNA task block with the updated input parameter. In some cases, the breadcrumb information for the first ADNA task block may include a timestamp for when the first ADNA task block invoked the exception ADNA task block, an identification of the first ADNA task block (e.g., an alphanumeric string that uniquely identifies the first ADNA task block), and an identification of the exception ADNA task block.

The term "microservices" may refer to a way of designing a software application as a suite of independently deployable services that typically each run in their own process and communicate through application programming interfaces (APIs), such as an HTTP resource API. A microservice may require a request-response or request-reply pattern when communicating with other microservices. In a request-response pattern, a requester or initiator of a communication sends a request message to a microservice and then waits for a corresponding response message before timing out or proceeding. In contrast, an ADNA task block does not use or require a request-response pattern when communicating with other ADNAs. When invoked, an ADNA task block acquires a set of input parameters, executes one or more workflow rules, and then invokes another ADNA based on an outcome of the execution of the one or more workflow rules. The one or more workflow rules may comprise flow logic (or logic) that implement one or more workflows that correspond with an enterprise process or a portion thereof. The flow logic may correspond with program code (e.g., a script or other form of machine executable instructions) that is stored in a persistence layer or using a non-volatile memory.

An API may comprise a set of rules and protocols that define how applications connect to and communicate with each other. A REST API may comprise an API that conforms to the design principles of the representational state transfer (REST) architectural style. REST APIs may be referred to as RESTful APIs. REST APIs provide a flexible, lightweight way to integrate applications, and have emerged as the most common method for connecting components in microservices architectures. REST APIs communicate via HTTP requests to perform standard database functions like creating, reading, updating, and deleting records (also known as CRUD) within a resource. For HTTP operations, a creation operation may comprise a POST operation, a reading operation may comprise a GET operation, an updating operation may comprise a PUT operation, and a delete operation may comprise a DELETE operation. In one example, a REST API may use a GET request to retrieve a record, a POST request to create a record, a PUT request to update a record, and a DELETE request to delete a record. When a client request is made via a RESTful API, it transfers a representation of the state of the resource to the requester or endpoint. The state of a resource at any particular instant, or timestamp, is known as the resource representation. This information can be delivered to a client in virtually any format including JavaScript Object Notation (JSON), HTML, or plain text. JSON is popular because it's readable by both humans and machines—and it is programming language-agnostic.

A dynamically scalable ADNA Manager with decentralized atomic decision making may execute processes related to the operation of a 5G network. For example, the ADNA Manager may orchestrate the execution of processes related to the creating and maintenance of network slices using a pool of ADNAs. In some embodiments, a ADNA Manager may manage a pool of ADNAs (e.g., twenty thousand ADNAs) that are responsible for performing core network functions.

FIG. 1A depicts an embodiment of a 5G network 102 including a radio access network (RAN) 120 and a core network 130. The radio access network 120 may comprise a new-generation radio access network (NG-RAN) that uses the 5G new radio interface (NR). The 5G network 102 connects user equipment (UE) 108 to the data network (DN) 180 using the radio access network 120 and the core network 130. The data network 180 may comprise the Internet, a local area network (LAN), a wide area network (WAN), a private data network, a wireless network, a wired network, or a combination of networks. The UE 108 may comprise an electronic device with wireless connectivity or cellular communication capability, such as a mobile phone or handheld computing device. In at least one example, the UE 108 may comprise a 5G smartphone or a 5G cellular device that connects to the radio access network 120 via a wireless connection. The UE 108 may comprise one of a number of UEs not depicted that are in communication with the radio access network 120. The UEs may include mobile and non-mobile computing devices. The UEs may include laptop computers, desktop computers, an Internet-of-Things (IoT) devices, and/or any other electronic computing device that includes a wireless communications interface to access the radio access network 120.

The radio access network 120 includes a remote radio unit (RRU) 202 for wirelessly communicating with UE 108. The remote radio unit (RRU) 202 may comprise a radio unit (RU) and may include one or more radio transceivers for wirelessly communicating with UE 108. The remote radio unit (RRU) 202 may include circuitry for converting signals sent to and from an antenna of a base station into digital signals for transmission over packet networks. The radio access network 120 may correspond with a 5G radio base station that connects user equipment to the core network 130. The 5G radio base station may be referred to as a generation Node B, a "gNodeB," or a "gNB." A base station may refer to a network element that is responsible for the transmission and reception of radio signals in one or more cells to or from user equipment, such as UE 108.

The core network 130 may utilize a cloud-native service-based architecture (SBA) in which different core network functions (e.g., authentication, security, session management, and core access and mobility functions) are virtualized and implemented as loosely coupled independent services that communicate with each other, for example, using HTTP protocols and APIs. In some cases, control plane (CP) functions may interact with each other using the service-based architecture. In at least one embodiment, a microservices-based architecture in which software is composed of small independent services that communicate over well-defined APIs may be used for implementing some of the core network functions. For example, control plane (CP) network functions for performing session management may be implemented as containerized applications or microservices. Although a microservice-based architecture does not necessarily require a container-based implementation, a container-based implementation may offer improved scalability and availability over other approaches. Network functions that have been implemented using microservices may store their state information using the unstructured data storage function (UDSF) that supports data storage for stateless network functions across the service-based architecture (SBA).

The primary core network functions may comprise the access and mobility management function (AMF), the session management function (SMF), and the user plane function (UPF). The UPF (e.g., UPF 132) may perform packet processing including routing and forwarding, quality of service (QoS) handling, and packet data unit (PDU) session management. The UPF may serve as an ingress and egress point for user plane traffic and provide anchored mobility support for user equipment. For example, the UPF 132 may provide an anchor point between the UE 108 and the data network 180 as the UE 108 moves between coverage areas. The AMF may act as a single-entry point for a UE connection and perform mobility management, registration management, and connection management between a data network and UE. The SMF may perform session management, user plane selection, and IP address allocation.

Other core network functions may include a network repository function (NRF) for maintaining a list of available network functions and providing network function service registration and discovery, a policy control function (PCF) for enforcing policy rules for control plane functions, an authentication server function (AUSF) for authenticating user equipment and handling authentication related functionality, a network slice selection function (NSSF) for selecting network slice instances, and an application function (AF) for providing application services. Application-level session information may be exchanged between the AF and PCF (e.g., bandwidth requirements for QoS). In some cases, when user equipment requests access to resources, such as establishing a PDU session or a QoS flow, the PCF may dynamically decide if the user equipment should grant the requested access based on a location of the user equipment.

A network slice may comprise an independent end-to-end logical communications network that includes a set of logically separated virtual network functions. Network slicing may allow different logical networks or network slices to be implemented using the same compute and storage infrastructure. Therefore, network slicing may allow heterogeneous services to coexist within the same network architecture via allocation of network computing, storage, and communication resources among active services. In some cases, the network slices may be dynamically created and adjusted over time based on network requirements. For example, some networks may require ultra-low-latency or ultra-reliable services. To meet ultra-low-latency requirements, components of the radio access network 120, such as a distributed unit (DU) and a centralized unit (CU), may need to be deployed at a cell site or in a local data center (LDC) that is in close proximity to a cell site such that the latency requirements are satisfied (e.g., such that the one-way latency from the cell site to the DU component or CU component is less than 1.2 ms).

In some embodiments, the distributed unit (DU) and the centralized unit (CU) of the radio access network 120 may be co-located with the remote radio unit (RRU) 202. In other embodiments, the distributed unit (DU) and the remote radio unit (RRU) 202 may be co-located at a cell site and the centralized unit (CU) may be located within a local data center (LDC).

The 5G network 102 may provide one or more network slices, wherein each network slice may include a set of network functions that are selected to provide specific telecommunications services. For example, each network slice may comprise a configuration of network functions, network applications, and underlying cloud-based compute and storage infrastructure. In some cases, a network slice may correspond with a logical instantiation of a 5G network, such as an instantiation of the 5G network 102. In some cases, the 5G network 102 may support customized policy configuration and enforcement between network slices per service level agreements (SLAs) within the radio access network (RAN) 120. User equipment, such as UE 108, may connect to multiple network slices at the same time (e.g., eight different network slices). In one embodiment, a PDU session, such as PDU session 104, may belong to only one network slice instance.

In some cases, the 5G network 102 may dynamically generate network slices to provide telecommunications services for various use cases, such the enhanced Mobile Broadband (eMBB), Ultra-Reliable and Low-Latency Communication (URLCC), and massive Machine Type Communication (mMTC) use cases.

A cloud-based compute and storage infrastructure may comprise a networked computing environment that provides a cloud computing environment. Cloud computing may refer to Internet-based computing, wherein shared resources, software, and/or information may be provided to one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The core network 130 may include a plurality of network elements that are configured to offer various data and telecommunications services to subscribers or end users of user equipment, such as UE 108. Examples of network elements include network computers, network processors, networking hardware, networking equipment, routers, switches, hubs, bridges, radio network controllers, gateways, servers, virtualized network functions, and network functions virtualization infrastructure. A network element may comprise a real or virtualized component that provides wired or wireless communication network services.

Virtualization allows virtual hardware to be created and decoupled from the underlying physical hardware. One example of a virtualized component is a virtual router (or a vRouter). Another example of a virtualized component is a virtual machine. A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 64 GB virtual disk) for the virtual machine. Another example of a virtualized component is a software container or an application container that encapsulates an application's environment.

In some embodiments, applications and services may be run using virtual machines instead of containers in order to improve security. A common virtual machine may also be used to run applications and/or containers for a number of closely related network services.

The 5G network 102 may implement various network functions, such as the core network functions and radio access network functions, using a cloud-based compute and storage infrastructure. A network function may be implemented as a software instance running on hardware or as a virtualized network function. Virtual network functions (VNFs) may comprise implementations of network functions as software processes or applications. In at least one example, a virtual network function (VNF) may be implemented as a software process or application that is run using virtual machines (VMs) or application containers within the cloud-based compute and storage infrastructure. Application containers (or containers) allow applications to be bundled with their own libraries and configuration files, and then executed in isolation on a single operating system (OS) kernel. Application containerization may refer to an OS-level virtualization method that allows isolated applications to be run on a single host and access the same OS kernel. Containers may run on bare-metal systems, cloud instances, and virtual machines. Network functions virtualization may be used to virtualize network functions, for example, via virtual machines, containers, and/or virtual hardware that runs processor readable code or executable instructions stored in one or more computer-readable storage mediums (e.g., one or more data storage devices).

As depicted in FIG. 1A, the core network 130 includes a user plane function (UPF) 132 for transporting IP data traffic (e.g., user plane traffic) between the UE 108 and the data network 180 and for handling packet data unit (PDU) sessions with the data network 180. The UPF 132 may comprise an anchor point between the UE 108 and the data network 180. The UPF 132 may be implemented as a software process or application running within a virtualized infrastructure or a cloud-based compute and storage infrastructure. The 5G network 102 may connect the UE 108 to the data network 180 using a packet data unit (PDU) session 104, which may comprise part of an overlay network.

The PDU session 104 may utilize one or more quality of service (QoS) flows, such as QoS flows 105 and 106, to exchange traffic (e.g., data and voice traffic) between the UE 108 and the data network 180. The one or more QoS flows may comprise the finest granularity of QoS differentiation within the PDU session 104. The PDU session 104 may belong to a network slice instance through the 5G network 102. To establish user plane connectivity from the UE 108 to the data network 180, an AMF that supports the network slice instance may be selected and a PDU session via the network slice instance may be established. In some cases, the PDU session 104 may be of type IPv4 or IPv6 for transporting IP packets. The radio access network 120 may be configured to establish and release parts of the PDU session 104 that cross the radio interface.

The radio access network 120 may include a set of one or more remote radio units (RRUs) that includes radio transceivers (or combinations of radio transmitters and receivers) for wirelessly communicating with UEs. The set of RRUs may correspond with a network of cells (or coverage areas) that provide continuous or nearly continuous overlapping service to UEs, such as UE 108, over a geographic area. Some cells may correspond with stationary coverage areas and other cells may correspond with coverage areas that change over time (e.g., due to movement of a mobile RRU).

In some cases, the UE 108 may be capable of transmitting signals to and receiving signals from one or more RRUs within the network of cells over time. One or more cells may correspond with a cell site. The cells within the network of cells may be configured to facilitate communication between UE 108 and other UEs and/or between UE 108 and a data network, such as data network 180. The cells may include macrocells (e.g., capable of reaching 18 miles) and small cells, such as microcells (e.g., capable of reaching 1.2 miles), picocells (e.g., capable of reaching 0.12 miles), and femtocells (e.g., capable of reaching 32 feet). Small cells may communicate through macrocells. Although the range of small cells may be limited, small cells may enable mmWave frequencies with high-speed connectivity to UEs within a short distance of the small cells. Macrocells may transit and receive radio signals using multiple-input multiple-output (MIMO) antennas that may be connected to a cell tower, an antenna mast, or a raised structure.

Referring to FIG. 1A, the UPF 132 may be responsible for routing and forwarding user plane packets between the radio access network 120 and the data network 180. Uplink packets arriving from the radio access network 120 may use a general packet radio service (GPRS) tunneling protocol (or GTP tunnel) to reach the UPF 132. The GPRS tunneling protocol for the user plane may support multiplexing of traffic from different PDU sessions by tunneling user data over the interface between the radio access network 120 and the UPF 132.

The UPF 132 may remove the packet headers belonging to the GTP tunnel before forwarding the user plane packets towards the data network 180. As the UPF 132 may provide connectivity towards other data networks in addition to the data network 180, the UPF 132 must ensure that the user plane packets are forwarded towards the correct data network. Each GTP tunnel may belong to a specific PDU session, such as PDU session 104. Each PDU session may be set up towards a specific data network name (DNN) that uniquely identifies the data network to which the user plane packets should be forwarded. The UPF 132 may keep a record of the mapping between the GTP tunnel, the PDU session, and the DNN for the data network to which the user plane packets are directed.

Downlink packets arriving from the data network 180 are mapped onto a specific QoS flow belonging to a specific PDU session before forwarded towards the appropriate radio access network 120. A QoS flow may correspond with a stream of data packets that have equal quality of service (QoS). A PDU session may have multiple QoS flows, such as the QoS flows 105 and 106 that belong to PDU session 104. The UPF 132 may use a set of service data flow (SDF) templates to map each downlink packet onto a specific QoS flow. The UPF 132 may receive the set of SDF templates from a session management function (SMF), such as the SMF 133 depicted in FIG. 1B, during setup of the PDU session 104. The SMF may generate the set of SDF templates using information provided from a policy control function (PCF), such as the PCF 135 depicted in FIG. 1C. The UPF 132 may track various statistics regarding the volume of data transferred by each PDU session, such as PDU session 104, and provide the information to an SMF.

Figure 1B:
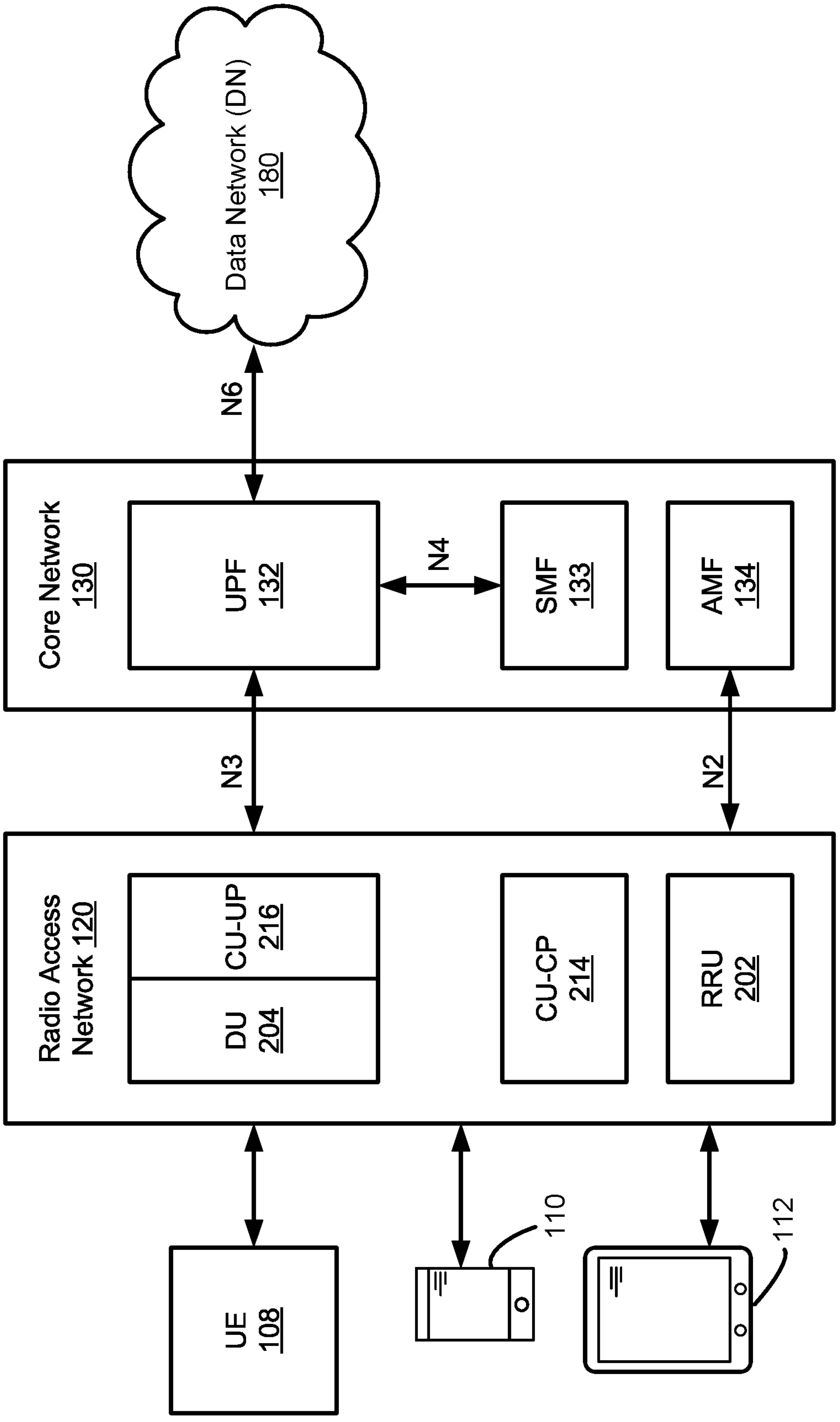
FIGS. 1B-1C depict embodiments of a radio access network and a core network for providing a communications channel (or channel) between user equipment and a data network.

FIG. 1B depicts an embodiment of a radio access network 120 and a core network 130 for providing a communications channel (or channel) between user equipment and data network 180. The communications channel may comprise a pathway through which data is communicated between the UE 108 and the data network 180. The user equipment in communication with the radio access network 120 includes UE 108, mobile phone 110, and mobile computing device 112. The user equipment may include a plurality of electronic devices, including mobile computing device and non-mobile computing device.

The core network 130 includes network functions such as an access and mobility management function (AMF) 134, a session management function (SMF) 133, and a user plane function (UPF) 132. The AMF may interface with user equipment and act as a single-entry point for a UE connection. The AMF may interface with the SMF to track user sessions. The AMF may interface with a network slice selection function (NSSF) not depicted to select network slice instances for user equipment, such as UE 108. When user equipment is leaving a first coverage area and entering a second coverage area, the AMF may be responsible for coordinating the handoff between the coverage areas whether the coverage areas are associated with the same radio access network or different radio access networks.

The UPF 132 may transfer downlink data received from the data network 180 to user equipment, such as UE 108, via the radio access network 120 and/or transfer uplink data received from user equipment to the data network 180 via the radio access network 180. An uplink may comprise a radio link though which user equipment transmits data and/or control signals to the radio access network 120. A downlink may comprise a radio link through which the radio access network 120 transmits data and/or control signals to the user equipment.

The radio access network 120 may be logically divided into a remote radio unit (RRU) 202, a distributed unit (DU) 204, and a centralized unit (CU) that is partitioned into a CU user plane portion CU-UP 216 and a CU control plane portion CU-CP 214. The CU-UP 216 may correspond with the centralized unit for the user plane and the CU-CP 214 may correspond with the centralized unit for the control plane. The CU-CP 214 may perform functions related to a control plane, such as connection setup, mobility, and security. The CU-UP 216 may perform functions related to a user plane, such as user data transmission and reception functions. Additional details of radio access networks are described in reference to FIG. 2A.

Decoupling control signaling in the control plane from user plane traffic in the user plane may allow the UPF 132 to be positioned in close proximity to the edge of a network compared with the AMF 134. As a closer geographic or topographic proximity may reduce the electrical distance, this means that the electrical distance from the UPF 132 to the UE 108 may be less than the electrical distance of the AMF 134 to the UE 108. The radio access network 120 may be connected to the AMF 134, which may allocate temporary unique identifiers, determine tracking areas, and select appropriate policy control functions (PCFs) for user equipment, via an N2 interface. The N3 interface may be used for transferring user data (e.g., user plane traffic) from the radio access network 120 to the user plane function UPF 132 and may be used for providing low-latency services using edge computing resources. The electrical distance from the UPF 132 (e.g., located at the edge of a network) to user equipment, such as UE 108, may impact the latency and performance services provided to the user equipment. The UE 108 may be connected to the SMF 133 via an N1 interface not depicted, which may transfer UE information directly to the AMF 134. The UPF 132 may be connected to the data network 180 via an N6 interface. The N6 interface may be used for providing connectivity between the UPF 132 and other external or internal data networks (e.g., to the Internet). The radio access network 120 may be connected to the SMF 133, which may manage UE context and network handovers between base stations, via the N2 interface. The N2 interface may be used for transferring control plane signaling between the radio access network 120 and the AMF 134.

The RRU 202 may perform physical layer functions, such as employing orthogonal frequency-division multiplexing (OFDM) for downlink data transmission. In some cases, the DU 204 may be located at a cell site (or a cellular base station) and may provide real-time support for lower layers of the protocol stack, such as the radio link control (RLC) layer and the medium access control (MAC) layer. The CU may provide support for higher layers of the protocol stack, such as the service data adaptation protocol (SDAP) layer, the packet data convergence control (PDCP) layer, and the radio resource control (RRC) layer. The SDAP layer may comprise the highest L2 sublayer in the 5G NR protocol stack. In some embodiments, a radio access network may correspond with a single CU that connects to multiple DUs (e.g., 10 DUs), and each DU may connect to multiple RRUs (e.g., 18 RRUs). In this case, a single CU may manage 10 different cell sites (or cellular base stations) and 180 different RRUs.

In some embodiments, the radio access network 120 or portions of the radio access network 120 may be implemented using multi-access edge computing (MEC) that allows computing and storage resources to be moved closer to user equipment. Allowing data to be processed and stored at the edge of a network that is located close to the user equipment may be necessary to satisfy low-latency application requirements. In at least one example, the DU 204 and CU-UP 216 may be executed as virtual instances within a data center environment that provides single-digit millisecond latencies (e.g., less than 2 ms) from the virtual instances to the UE 108.

Figure 1C:
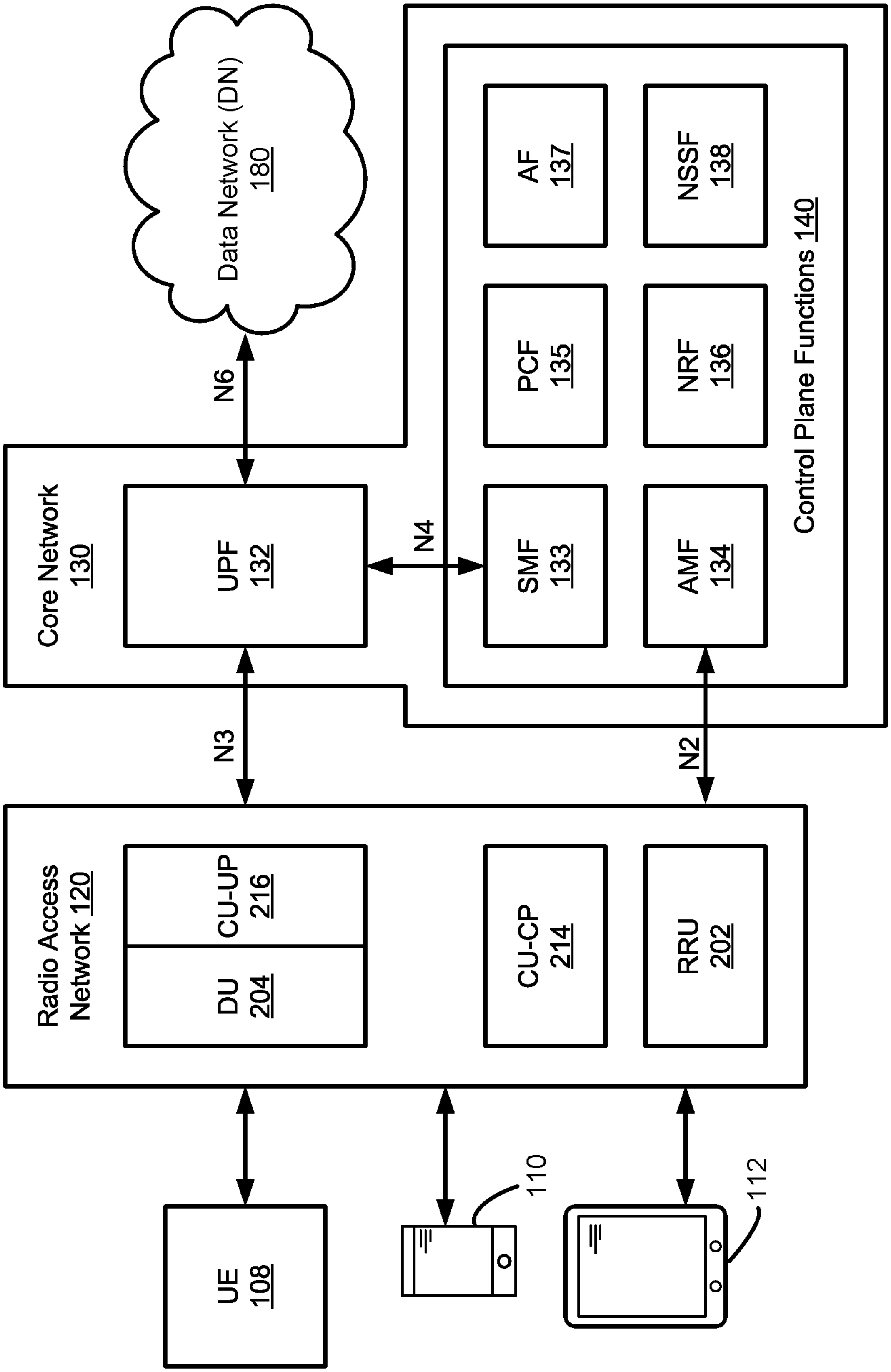

FIG. 1C depicts an embodiment of a radio access network 120 and a core network 130 for providing a communications channel (or channel) between user equipment and data network 180. The core network 130 includes UPF 132 for handling user data in the core network 130. Data is transported between the radio access network 120 and the core network 130 via the N3 interface. The data may be tunneled across the N3 interface (e.g., IP routing may be done on the tunnel header IP address instead of using end user IP addresses). This may allow for maintaining a stable IP anchor point even though UE 108 may be moving around a network of cells or moving from one coverage area into another coverage area. The UPF 132 may connect to external data networks, such as the data network 180 via the N6 interface. The data may not be tunneled across the N6 interface as IP packets may be routed based on end user IP addresses. The UPF 132 may connect to the SMF 133 via the N4 interface.

As depicted, the core network 130 includes a group of control plane functions 140 comprising SMF 133, AMF 134, PCF 135, NRF 136, AF 137, and NSSF 138. The SMF 133 may configure or control the UPF 132 via the N4 interface. For example, the SMF 133 may control packet forwarding rules used by the UPF 132 and adjust QoS parameters for QoS enforcement of data flows (e.g., limiting available data rates). In some cases, multiple SMF/UPF pairs may be used to simultaneously manage user plane traffic for a particular user device, such as UE 108. For example, a set of SMFs may be associated with UE 108, wherein each SMF of the set of SMFs corresponds with a network slice. The SMF 133 may control the UPF 132 on a per end user data session basis, in which the SMF 133 may create, update, and remove session information in the UPF 132.

In some cases, the SMF 133 may select an appropriate UPF for a user plane path by querying the NRF 136 to identify a list of available UPFs and their corresponding capabilities and locations. The SMF 133 may select the UPF 132 based on a physical location of the UE 108 and a physical location of the UPF 132 (e.g., corresponding with a physical location of a data center in which the UPF 132 is running). The SMF 133 may also select the UPF 132 based on a particular network slice supported by the UPF 132 or based on a particular data network that is connected to the UPF 132. The ability to query the NRF 136 for UPF information eliminates the need for the SMF 133 to store and update the UPF information for every available UPF within the core network 130.

In some embodiments, the SMF 133 may query the NRF 136 to identify a set of available UPFs for a packet data unit (PDU) session and acquire UPF information from a variety of sources, such as the AMF 134 or the UE 108. The UPF information may include a location of the UPF 132, a location of the UE 108, the UPF's dynamic load, the UPF's static capacity among UPFs supporting the same data network, and the capability of the UPF 132.

The radio access network 120 may provide separation of the centralized unit for the control plane (CU-CP) 216 and the centralized unit for the user plane (CU-UP) 214 functionalities while supporting network slicing. The CU-CP 216 may obtain resource utilization and latency information from the DU 204 and/or the CU-UP 216, and select a CU-UP to pair with the DU 204 based on the resource utilization and latency information in order to configure a network slice. Network slice configuration information associated with the network slice may be provided to the UE 108 for purposes of initiating communication with the UPF 132 using the network slice.

Figure 2A:
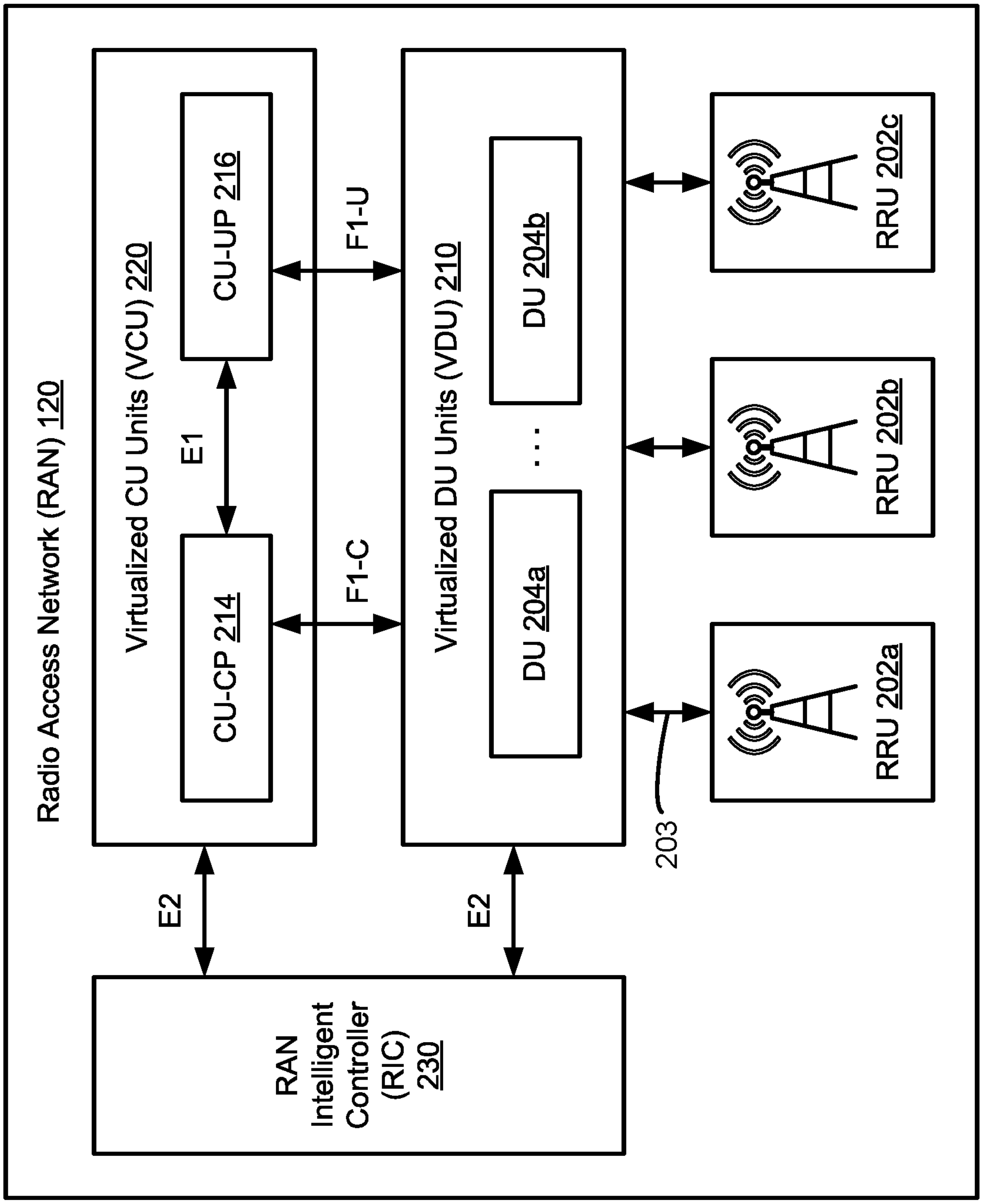
FIGS. 2A-2C depict embodiments of a radio access network.

FIG. 2A depicts an embodiment of a radio access network 120. The radio access network 120 includes virtualized CU units 220, virtualized DU units 210, remote radio units (RRUs) 202, and a RAN intelligent controller (RIC) 230. The virtualized DU units 210 may comprise virtualized versions of distributed units (DUs) 204. The distributed unit (DU) 204 may comprise a logical node configured to provide functions for the radio link control (RLC) layer, the medium access control (MAC) layer, and the physical layer (PHY) layers. The virtualized CU units 220 may comprise virtualized versions of centralized units (CUs) comprising a centralized unit for the user plane CU-CP 216 and a centralized unit for the control plane CU-CP 214. In one example, the centralized units (CUs) may comprise a logical node configured to provide functions for the radio resource control (RRC) layer, the packet data convergence control (PDCP) layer, and the service data adaptation protocol (SDAP) layer. The centralized unit for the control plane CU-CP 214 may comprise a logical node configured to provide functions of the control plane part of the RRC and PDCP. The centralized unit for the user plane CU-CP 216 may comprise a logical node configured to provide functions of the user plane part of the SDAP and PDCP. Virtualizing the control plane and user plane functions allows the centralized units (CUs) to be consolidated in one or more data centers on RAN-based open interfaces.

The remote radio units (RRUs) 202 may correspond with different cell sites. A single DU may connect to multiple RRUs via a fronthaul interface 203. The fronthaul interface 203 may provide connectivity between DUs and RRUs. For example, DU 204*a* may connect to 18 RRUs via the fronthaul interface 203. A centralized units (CUs) may control the operation of multiple DUs via a midhaul F1 interface that comprises the F1-C and F1-U interfaces. The F1 interface may support control plane and user plane separation, and separate the Radio Network Layer and the Transport Network Layer. In one example, the centralized unit for the control plane CU-CP 214 may connect to ten different DUs within the virtualized DU units 210. In this case, the centralized unit for the control plane CU-CP 214 may control ten DUs and 180 RRUs. A single distributed unit (DU) 204 may be located at a cell site or in a local data center. Centralizing the distributed unit (DU) 204 at a local data center or at a single cell site location instead of distributing the DU 204 across multiple cell sites may result in reduced implementation costs.

The centralized unit for the control plane CU-CP 214 may host the radio resource control (RRC) layer and the control plane part of the packet data convergence control (PDCP) layer. The E1 interface may separate the Radio Network Layer and the Transport Network Layer. The CU-CP 214 terminates the E1 interface connected with the centralized unit for the user plane CU-UP 216 and the F1-C interface connected with the distributed units (DUs) 204. The centralized unit for the user plane CU-UP 216 hosts the user plane part of the packet data convergence control (PDCP) layer and the service data adaptation protocol (SDAP) layer. The CU-UP 216 terminates the E1 interface connected with the centralized unit for the control plane CU-CP 214 and the F1-U interface connected with the distributed units (DUs) 204. The distributed units (DUs) 204 may handle the lower layers of the baseband processing up through the packet data convergence control (PDCP) layer of the protocol stack. The interfaces F1-C and E1 may carry signaling information for setting up, modifying, relocating, and/or releasing a UE context.

The RAN intelligent controller (RIC) 230 may control the underlying RAN elements via the E2 interface. The E2 interface connects the RAN intelligent controller (RIC) 230 to the distributed units (DUs) 204 and the centralized units CU-CP 214 and CU-UP 216. The RAN intelligent controller (RIC) 230 may comprise a near-real time RIC. A non-real-time RIC (NRT-RIC) not depicted may comprise a logical node allowing non-real time control rather than near-real-time control and the near-real-time RIC 230 may comprise a logical node allowing near-real-time control and optimization of RAN elements and resources on the bases of information collected from the distributed units (DUs) 204 and the centralized units CU-CP 214 and CU-UP 216 via the E2 interface.

The virtualization of the distributed units (DUs) 204 and the centralized units CU-CP 214 and CU-UP 216 allows various deployment options that may be adjusted over time based on network conditions and network slice requirements. In at least one example, both a distributed unit (DU) 204 and a corresponding centralized unit CU-UP 216 may be implemented at a cell site. In another example, a distributed unit (DU) 204 may be implemented at a cell site and the corresponding centralized unit CU-UP 216 may be implemented at a local data center (LDC). In another example, both a distributed unit (DU) 204 and a corresponding centralized unit CU-UP 216 may be implemented at a local data center (LDC). In another example, both a distributed unit (DU) 204 and a corresponding centralized unit CU-UP 216 may be implemented at a cell site, but the corresponding the centralized unit CU-CP 214 may be implemented at a local data center (LDC). In another example, a distributed unit (DU) 204 may be implemented at a local data center (LDC) and the corresponding centralized units CU-CP 214 and CU-UP 216 may be implemented at an edge data center (EDC).

In some embodiments, network slicing operations may be communicated via the E1, F1-C, and F1-U interfaces of the radio access network 120. For example, CU-CP 214 may select the appropriate DU 204 and CU-UP 216 entities to serve a network slicing request associated with a particular service level agreement (SLA).

Figure 2B:
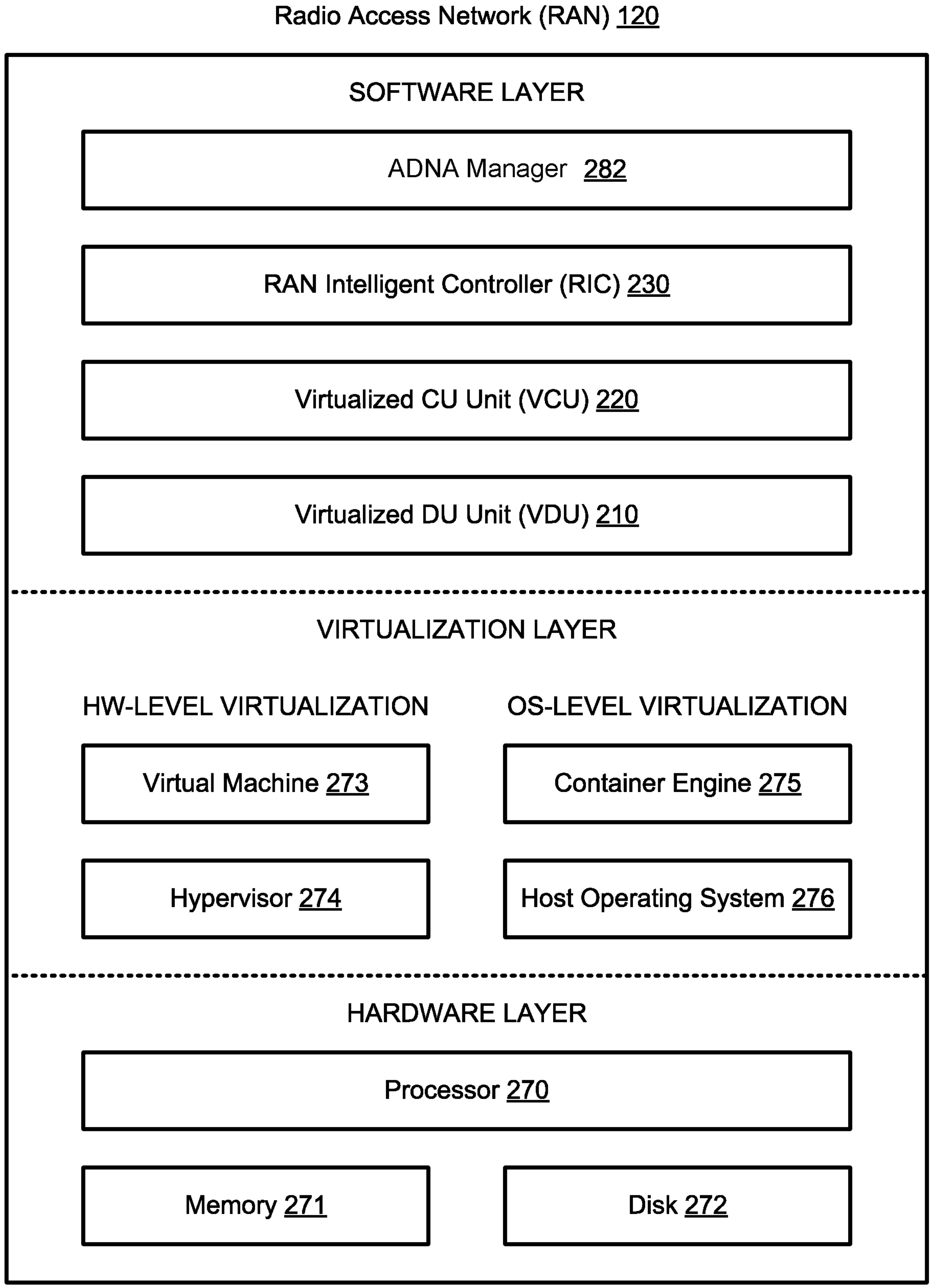

FIG. 2B depicts another embodiment of a radio access network 120. As depicted, the radio access network 120 includes hardware-level components and software-level components. The hardware-level components include one or more processors 270, one or more memory 271, and one or more disks 272. The software-level components include software applications, such as a RAN intelligent controller (RIC) 230, virtualized CU unit (VCU) 220, and virtualized DU unit (VDU) 210. The software-level components also include an ADNA Manager 282 for orchestrating the execution of various RAN processes, such as the RIC 230, VCU 220, and VDU 210 using a pool of ADNAs. The ADNA Manager 282 may initiate a RAN process by identifying an initiator ADNA for the RAN process within the pool of ADNAs and invoking the initiator ADNA. Over time, the ADNA Manager 282 may add, remove, or update ADNAs. The software-level components may be run using the hardware-level components or executed using processor and storage components of the hardware-level components. In one example, one or more of the RIC 230, VCU 220, and VDU 210 may be run using the processor 270, memory 271, and disk 272. In another example, one or more of the RIC 230, VCU 220, and VDU 210 may be run using a virtual processor and a virtual memory that are themselves executed or generated using the processor 270, memory 271, and disk 272.

The software-level components also include virtualization layer processes, such as virtual machine 273, hypervisor 274, container engine 275, and host operating system 276. The hypervisor 274 may comprise a native hypervisor (or bare-metal hypervisor) or a hosted hypervisor (or type 2 hypervisor). The hypervisor 274 may provide a virtual operating platform for running one or more virtual machines, such as virtual machine 273. A hypervisor may comprise software that creates and runs virtual machine instances. Virtual machine 273 may include a plurality of virtual hardware devices, such as a virtual processor, a virtual memory, and a virtual disk. The virtual machine 273 may include a guest operating system that has the capability to run one or more software applications, such as the RAN intelligent controller (RIC) 230. The virtual machine 273 may run the host operation system 276 upon which the container engine 275 may run. A virtual machine, such as virtual machine 273, may include one or more virtual processors.

A container engine 275 may run on top of the host operating system 276 in order to run multiple isolated instances (or containers) on the same operating system kernel of the host operating system 276. Containers may perform virtualization at the operating system level and may provide a virtualized environment for running applications and their dependencies. The container engine 275 may acquire a container image and convert the container image into running processes. In some cases, the container engine 275 may group containers that make up an application into logical units (or pods). A pod may contain one or more containers and all containers in a pod may run on the same node in a cluster. Each pod may serve as a deployment unit for the cluster. Each pod may run a single instance of an application.

In order to scale an application horizontally, multiple instances of a pod may be run in parallel. A "replica" may refer to a unit of replication employed by a computing platform to provision or deprovision resources. Some computing platforms may run containers directly and therefore a container may comprise the unit of replication. Other computing platforms may wrap one or more containers into a pod and therefore a pod may comprise the unit of replication.

A replication controller may be used to ensure that a specified number of replicas of a pod are running at the same time. If less than the specified number of pods are running (e.g., due to a node failure or pod termination), then the replication controller may automatically replace a failed pod with a new pod. In some cases, the number of replicas may be dynamically adjusted based on a prior number of node failures. For example, if it is detected that a prior number of node failures for nodes in a cluster running a particular network slice has exceeded a threshold number of node failures, then the specified number of replicas may be increased (e.g., increased by one). Running multiple pod instances and keeping the specified number of replicas constant may prevent users from losing access to their application in the event that a particular pod fails or becomes inaccessible.

In some embodiments, a virtualized infrastructure manager not depicted may run on the radio access network (RAN) 120 in order to provide a centralized platform for managing a virtualized infrastructure for deploying various components of the radio access network (RAN) 120. The virtualized infrastructure manager may manage the provisioning of virtual machines, containers, and pods. The virtualized infrastructure manager may also manage a replication controller responsible for managing a number of pods. In some cases, the virtualized infrastructure manager may perform various virtualized infrastructure related tasks, such as cloning virtual machines, creating new virtual machines, monitoring the state of virtual machines, and facilitating backups of virtual machines.

Figure 2C:
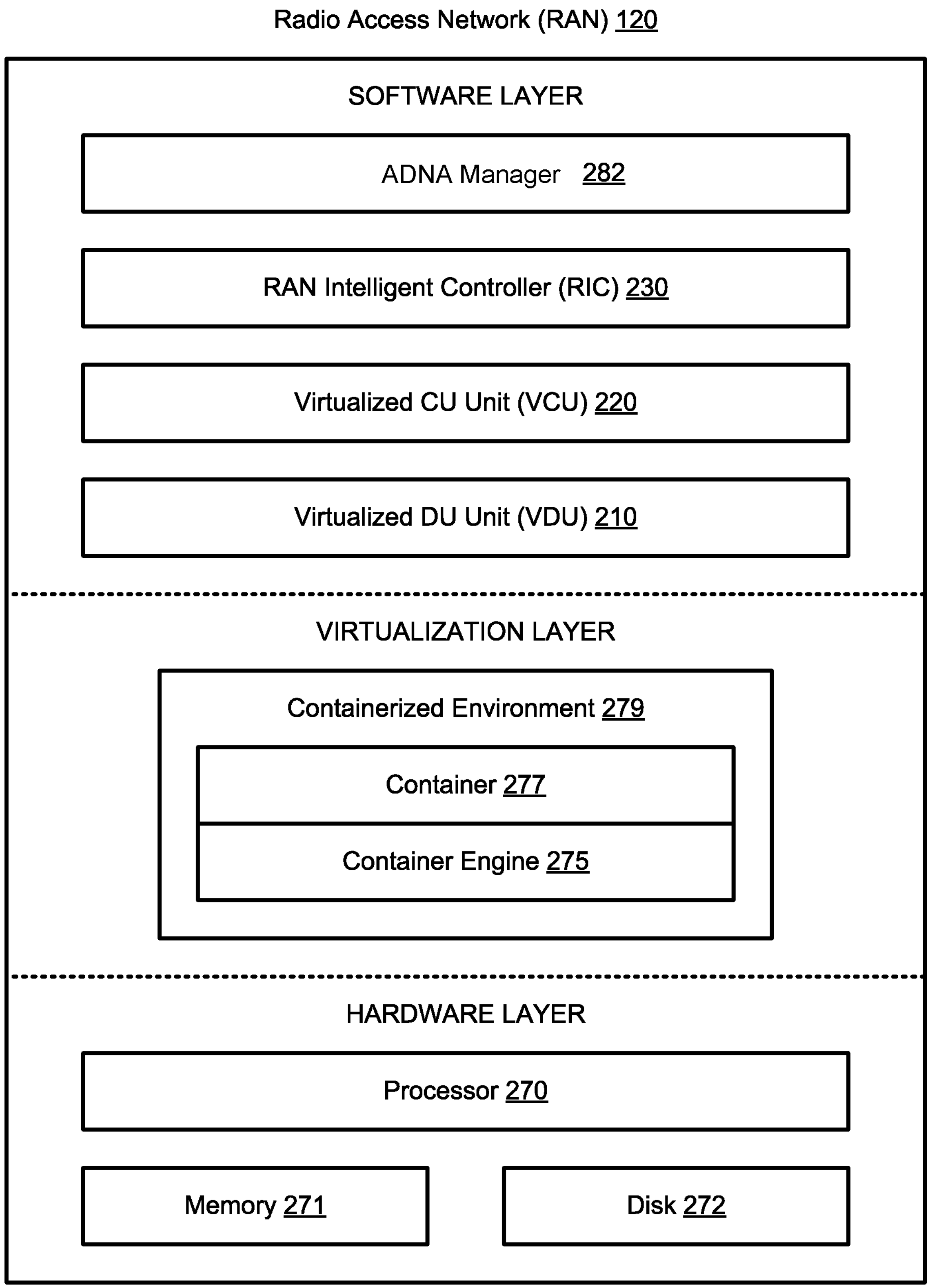

FIG. 2C depicts an embodiment of the radio access network 120 of FIG. 2B in which the virtualization layer includes a containerized environment 279. The containerized environment 279 includes a container engine 275 for instantiating and managing application containers, such as container 277. Containerized applications may comprise applications that run in isolated runtime environments (or containers). The containerized environment 279 may include a container orchestration service for automating the deployments of containerized applications. The container 277 may be used to deploy microservices for running network functions. The container 277 may run DU components and/or CU components of the radio access network (RAN) 120. The containerized environment 279 may be executed using hardware-level components or executed using processor and storage components of the hardware-level components. In one example, the containerized environment 279 may be run using the processor 270, memory 271, and disk 272. In another example, the containerized environment 279 may be run using a virtual processor and a virtual memory that are themselves executed or generated using the processor 270, memory 271, and disk 272.

Figure 2D:
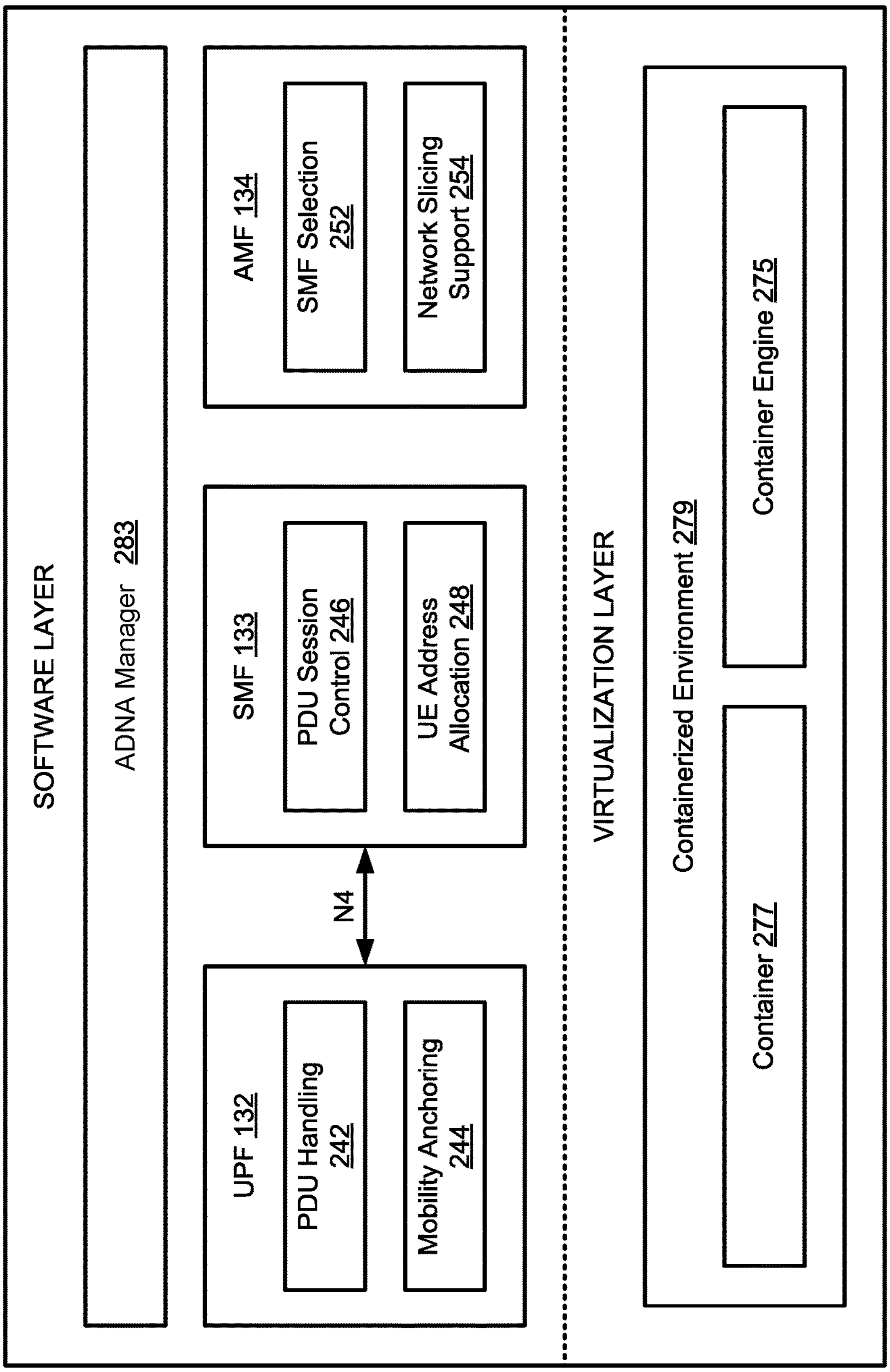
FIG. 2D depicts an embodiment of a core network.

FIG. 2D depicts an embodiment of a core network 130. As depicted, the core network 130 includes implementation for core network functions UPF 132, SMF 133, and AMF 134. The core network 130 may be used to provide Internet access for user equipment via a radio access network, such as the radio access network 120 in FIG. 1C. The AMF 134 may be configured to host various functions including SMF selection 252 and network slicing support 254. The UPF 132 may be configured to host various functions including mobility anchoring 244, packet data unit (PDU) handling 242, and QoS handling for the user plane. The SMF 133 may be configured to host various functions including UE IP address allocation and management 248, selection and control of user plane functions, and PDU session control 246. The core network functions may be run using containers within the containerized environment 279 that includes a container engine 275 for instantiating and managing application containers, such as container 277. In some embodiments, the containerized environment 279 may be executed or generated using a plurality of machines as depicted in FIG. 2D or may be executed or generated using hardware-level components, such as the processor 270, memory 271, and disk 272 depicted in FIG. 2C.

Referring to FIG. 2D, the software-level components also include an ADNA Manager 283 for managing the various core network processes, such as the UPF 132, SMF 133, and AMF 134 using a pool of multiple ADNAs. The ADNA Manager 283 will be aware of an Initiator ADNA having been triggered by an external source from a pool of ADNAs. Over time ADNA Manager 283 may add, remove, or update ADNAs. The ADNA Manager may also repair an ADNA by automatically updating one of more workflow rules for the ADNA that needs repair. This repair could also be updating of the next action table for the ADNA in question. In one example, a new ADNA may be added to the pool of ADNAs and that ADNA Manager 283 may update a next action table for the repaired ADNA to point to the new ADNA. In another example, the ADNA Manager 283 may add a new workflow rule to the one or more workflow rules for the repaired ADNA based on a number of exception ADNAs invoked by the repaired ADNA. These repair capabilities may also be handled by implementing another specialized component, a Repair ADNA.

Figure 2E:
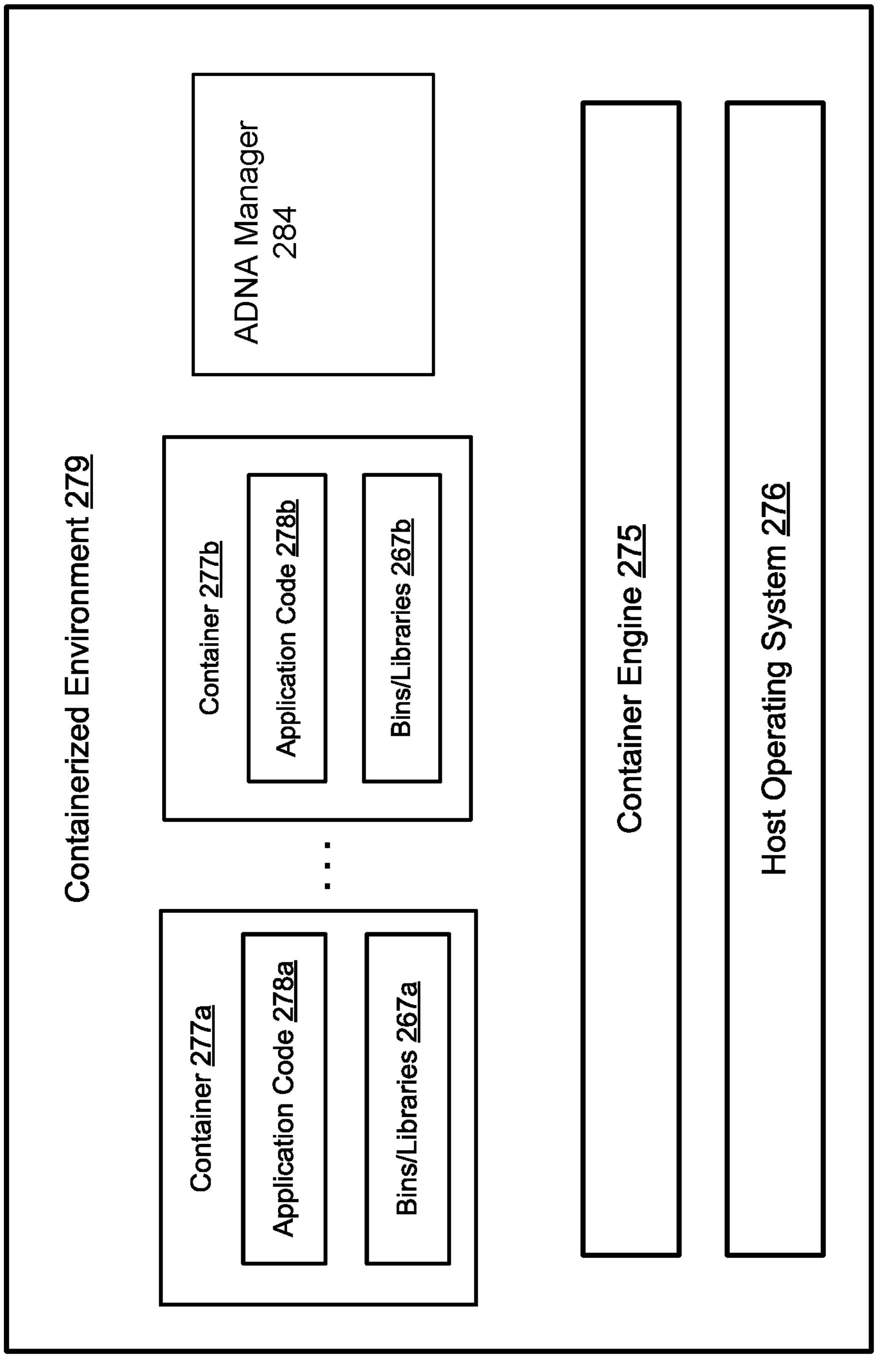
FIG. 2E depicts an embodiment of a containerized environment that includes a container engine running on top of a host operating system.

FIG. 2E depicts an embodiment of a containerized environment 279 that includes a container engine 275 running on top of a host operating system 276. The container engine 275 may manage or run containers 277 on the same operating system kernel of the host operating system 276. The container engine 275 may acquire a container image and convert the container image into one or more running processes. In some cases, the container engine 275 may group containers that make up an application into logical units (or pods). A pod may contain one or more containers and all containers in a pod may run on the same node in a cluster. Each container 277 may include application code 278 and application dependencies 267, such as operating system libraries, required to run the application code 278. Containers allow portability by encapsulating an application within a single executable package of software that bundles application code 278 together with the related configuration files, binaries, libraries, and dependencies required to run the application code 278.

In one embodiment, an ADNA Manager 284 shown in FIG. 2E is run using the containerized environment 279. The ADNA Manager 284 operates as a container that is aware of all the different ADNAs housed within it. The ADNA Manager 284 manages various functions as needed, such as lifecyle, resource allocation, recycling, and the like. In some embodiments, the ADNA Manager 284 houses the functions of being intelligent of the operations statistics of all ADNAs contained within it.

Figure 3A:
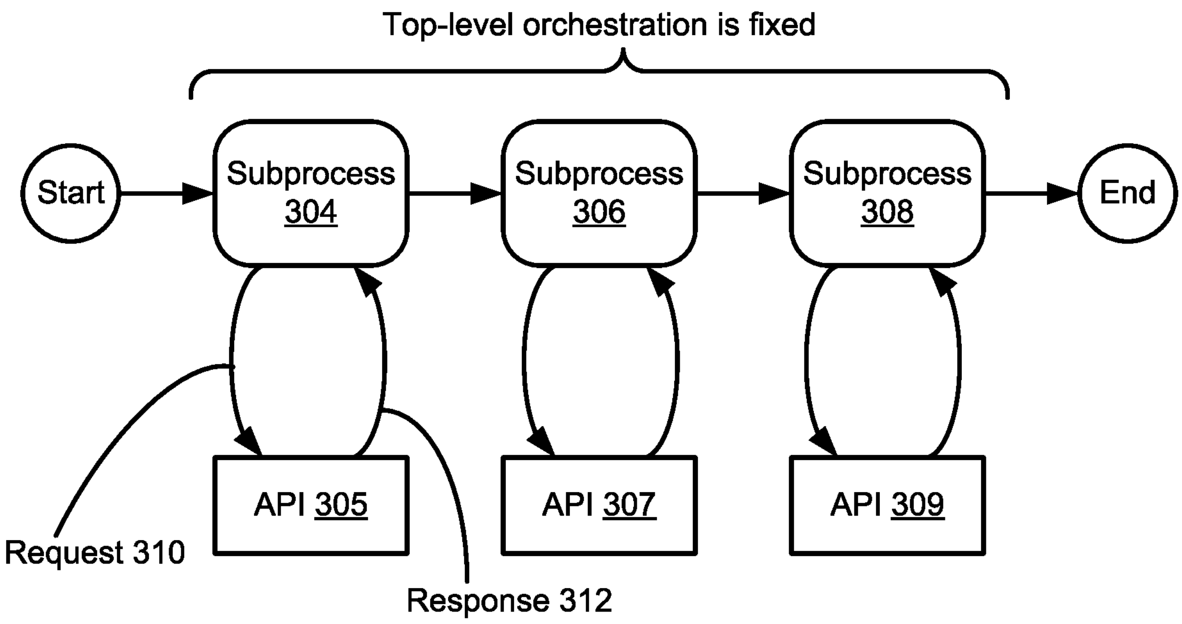
FIG. 3A depicts one embodiment of a microservices orchestration for performing a process.

FIG. 3A depicts one embodiment of a microservices orchestration for performing a process. The microservices orchestration may be represented using a business process model and notation (BPMN) graphical model. As depicted, the process requires three subprocesses 304, 306, and 308 to be performed. The subprocesses may be determined before runtime of the process such that prior to the execution of the subprocess 304, the total number of subprocesses for the process is known and is three subprocesses. In this case, the top-level orchestration is fixed prior to execution of the subprocess 304. The subprocess 304 may interact with an API 305 providing a request 310 to the API 305 and receiving a response 312 from the API 305. Each of the subprocesses 304, 306, and 308 may communicate with the corresponding API 305, 307, and 309 using a request-response pattern. For example, subprocess 304 may send a request message, such as request 310, to the API 305 and then wait for a corresponding response message, such as response 312, before execution of the next subprocess 306. Unlike the subprocesses in FIG. 3A, an ADNA task block does not require a request-response pattern prior to invoking another ADNA.

Figure 3B:
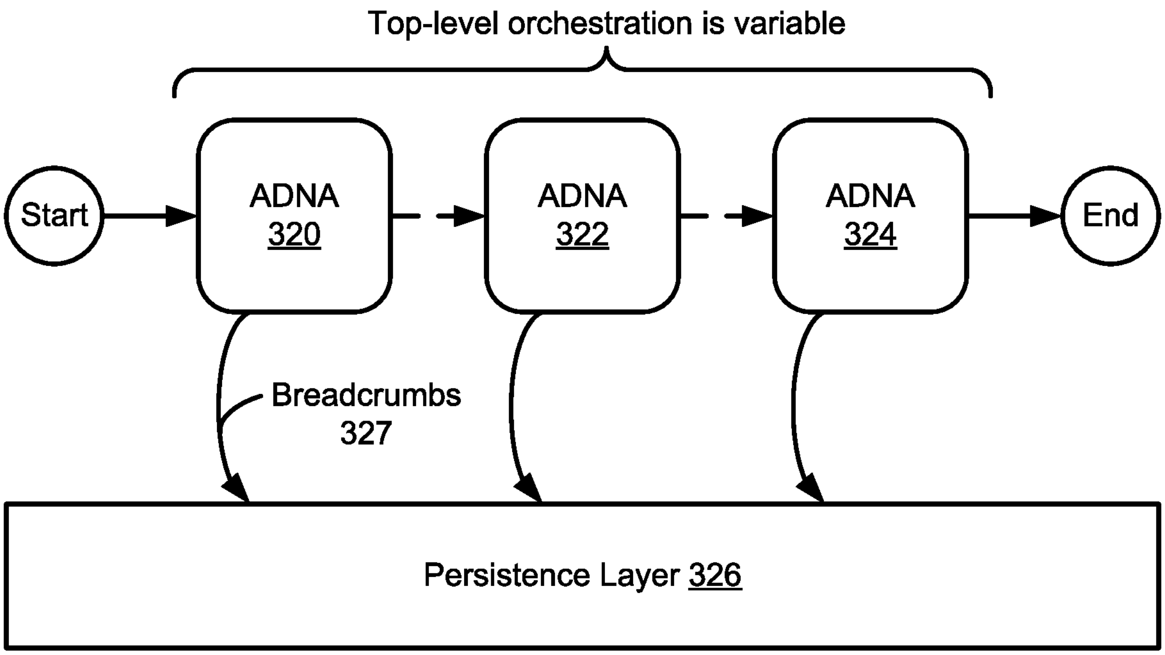
FIG. 3B depicts one embodiment of a process performed using a plurality of atomic deterministic next action (ADNA) task blocks.

FIG. 3B depicts one embodiment of a process performed using a plurality of atomic deterministic next action (ADNA) task blocks. As depicted, the process is performed using three ADNAs 320, 322, and 324 that individually do not require a request-response pattern prior to invoking a subsequent ADNA. In this case, as the top-level orchestration is variable and not fixed prior to execution of the initiator ADNA 320, the total number of ADNA task blocks used to execute the process may vary over time. The dotted arrow between the ADNAs 320, 322, and 324 is used to represent that other ADNAs may be invoked during execution of the process. The decision to invoke one or more other ADNAs may be made individually by each of the ADNAs 320, 322, and 324. Prior to invoking a subsequent ADNA (or a next action ADNA), an ADNA may store data associated with an identification of the ADNA, an identification of the subsequent ADNA to be invoked, a timestamp associated with a time at which the subsequent ADNA was invoked, and one or more parameters used by the ADNA within a shared persistence layer (e.g., within persistent storage), such as persistence layer 326. The data written to the shared persistence layer may comprise breadcrumbs 327. The breadcrumbs 327 may be accessed by a first ADNA in order to identify which ADNA invoked the first ADNA. In some cases, the first ADNA may access the breadcrumbs 327 to determine the error or out of range data parameter that lead to the first ADNA being invoked.

Figure 3C:
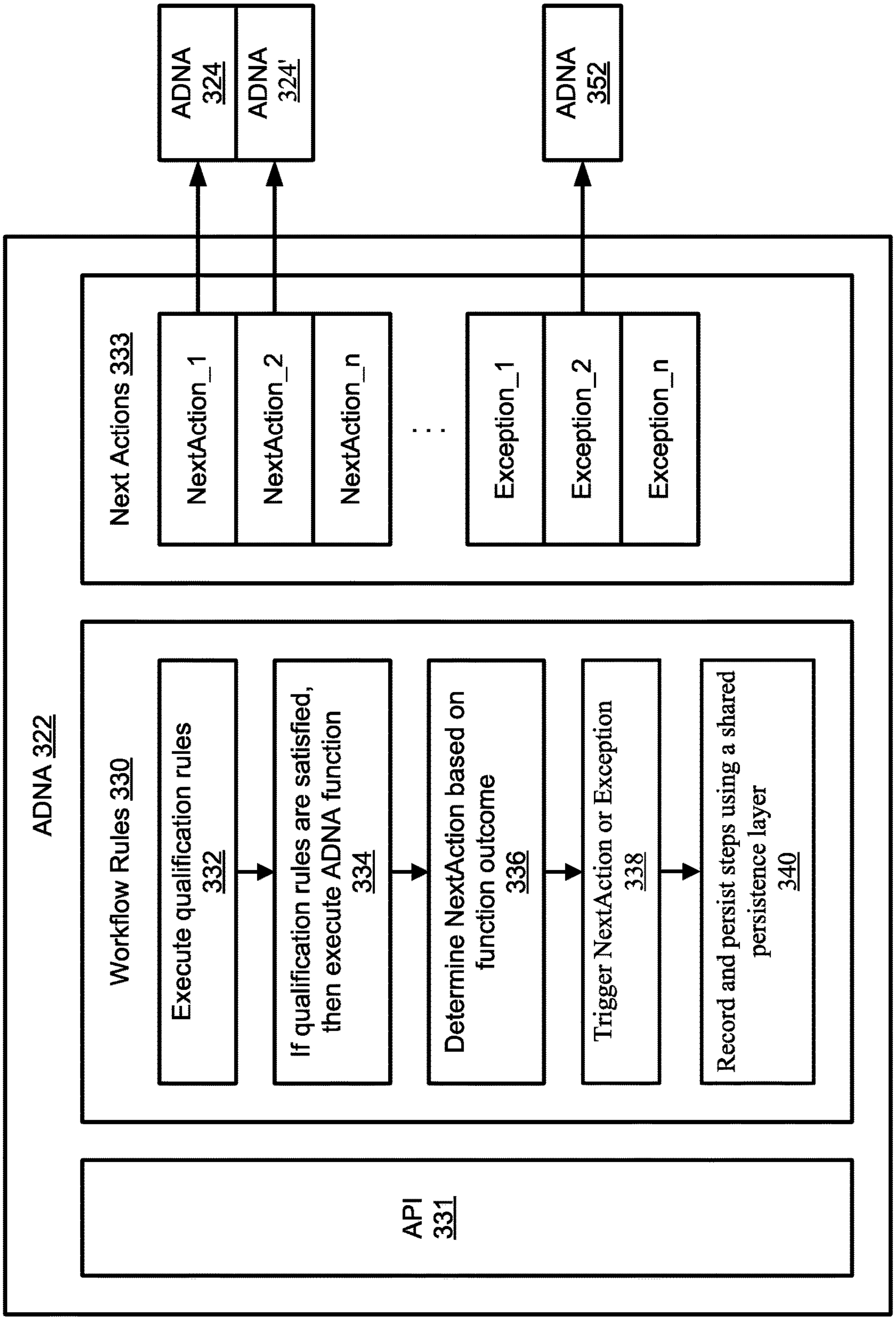
FIG. 3C depicts one embodiment of an ADNA.

FIG. 3C depicts one embodiment of an ADNA 322. The ADNA 322 includes an API 331, workflow rules 330, and next actions 333. The API 331 may provide an interface for invoking the ADNA 322. The API 331 may require a specified set of inputs. The workflow rules 330 may include program code for one or more workflow rules. The next actions 333 may include a mapping table for mapping a function outcome from the workflow rules 330 to a subsequent ADNA to be invoked by the ADNA 322. The next actions 333 may map the outcomes or results from the application of the one or more workflow rules to one or more next action ADNAs in the case that the generated outcomes and results meet predetermined criteria or to one or more exception ADNAs in the case that the generated outcomes and results do not meet the predetermined criteria (e.g., a function outcome may not meet the predetermined criteria if a numerical value for the function outcome is greater than a maximum threshold value or less than a minimum threshold value).

The workflow rules 330 may be executed to implement one or more specific tasks to be performed by the ADNA 322. In some cases, the ADNA 322 may acquire a set of input parameters from the API 331 and execute qualification rules to determine whether the set of input parameters satisfy the qualification rules. In one example, the qualification rules may require that each of the set of input parameters are of a particular type (e.g., a character string or a floating-point number), that each of the set of input parameters are within a particular range (e.g., between a minimum and maximum value), and that at least a threshold number of input parameters have been passed to the ADNA 322 via the API 331. If the qualification rules are satisfied, then an ADNA function may be executed using the set of input parameters. The ADNA 322 may determine a subsequent ADNA to be invoked based on an outcome of the ADNA function. Prior to invoking the subsequent ADNA, breadcrumbs including an identification of the ADNA 322, an identification of the subsequent ADNA to be invoked, the set of input parameters, the outcome of the ADNA function, and a timestamp associated with a time at which the subsequent ADNA was invoked by the ADNA 322 is written to a persistence layer.

A process specified by the workflow rules 330 may be performed using one or more real machines, one or more virtual machines, and/or one or more containerized applications. In one embodiment, the process specified by the workflow rules 330 may be performed using a containerized environment, such as the containerized environment 279 in FIG. 2E.

As depicted in FIG. 3C, the process specified by the workflow rules 330 tests one or more qualifications rules on input parameters passed to the ADNA 322, executes an ADNA function using the input parameters, determines a subsequent ADNA to be invoked based on an outcome of the ADNA function, writes breadcrumb information to a shared persistence layer, and invokes the subsequent ADNA after the breadcrumb information has been stored within the shared persistence layer. The process specified by the workflow rules 330 in FIG. 3C includes operations 332, 334, 336, 338, and 340. In operation 332, qualification rules are applied to and executed to ensure that the required input parameters have been received by the ADNA 322 via the API 331. In operation 334, it is determined whether the qualification rules for the input parameters have been satisfied and if the qualification rules have been satisfied, then additional processing is performed such as executing an ADNA function. If it is determined that one or more of the qualification rules for the input parameters have not been satisfied, then an exception ADNA may be invoked based on the one or more qualification rules that were not satisfied. For example, if a second input parameter is not within a valid range, then the exception ADNA 352 referenced by the mapping table entry Exception_2 that corresponds with an out of range second input parameter may be invoked by the ADNA 322. In operation 336, a subsequent ADNA (or a next action ADNA) is determined based on an outcome of the ADNA function. In one example, if the outcome of the ADNA function is greater than a threshold value, then the next action ADNA 324 referenced by NextAction_1 may be invoked; otherwise, if the outcome of the ADNA function is not greater than the threshold value, then the next action ADNA 324 referenced by NextAction_2 may be invoked. As depicted in FIG. 3C, the mapping entry for NextAction_1 is to ADNA 324 and the mapping entry for NextAction_2 is to ADNA 324'. Over time, the mapping entries of the next actions 333 may be adjusted to reference other ADNAs. In operation 338, a next action ADNA or an exception ADNA is invoked or triggered based on the function outcome. In operation 340, breadcrumb information including an identification of the ADNA 322 and the input parameters passed to the ADNA 322 may be stored using a shared persistence layer, such as persistent layer 326.

Figure 3D:
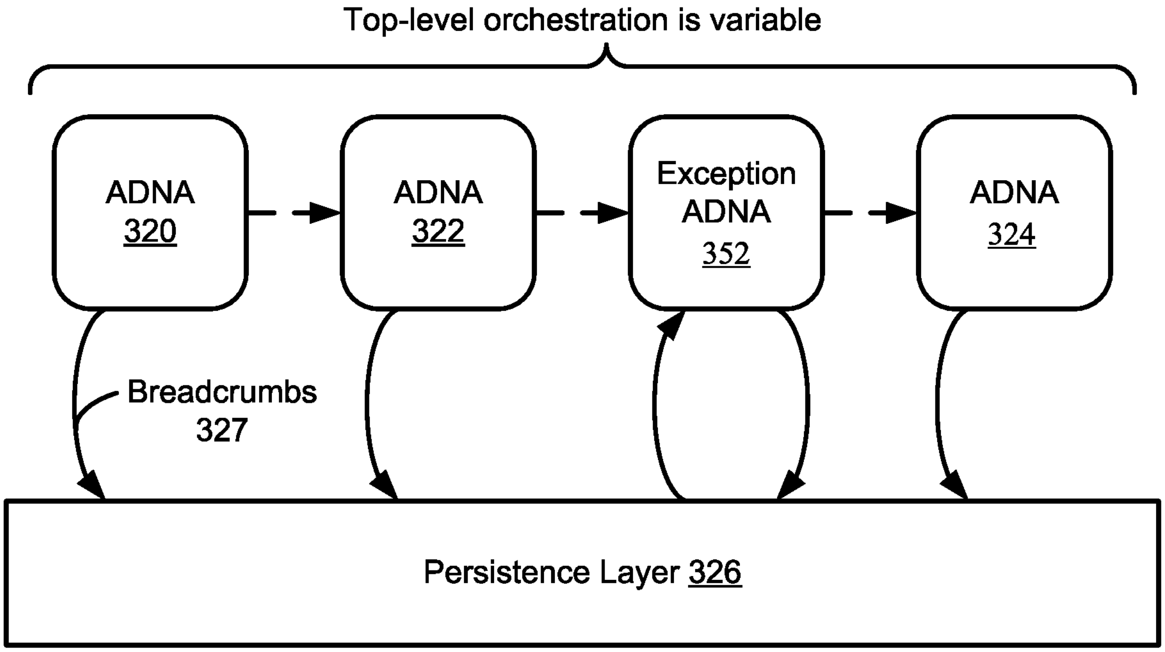
FIG. 3D depicts one embodiment of the process performed in FIG. 3B in which an exception ADNA was invoked.

FIG. 3D depicts one embodiment of the process performed in FIG. 3B in which an exception ADNA was invoked. As depicted, during execution of the ADNA 322, an exception condition occurred that triggered invocation of the exception ADNA 352. In one example, an exception ADNA may be invoked when an input parameter is out of range or an outcome of an ADNA function is out of range (e.g., the ADNA function generates a value that is greater than a maximum threshold value). The exception ADNA 352 may acquire breadcrumb information associated with the ADNA invoking the exception ADNA 352 from the persistence layer 326. In one example, the breadcrumb information may include an identification of the ADNA 322 that invoked (or called) the exception ADNA 352 at a particular time. The breadcrumb information may also be used to identify an input parameter that was out of range or a set of input parameters that led to the outcome of the ADNA function from being out of range. The exception ADNA 352 may acquire an updated input parameter or compute the updated input parameter so that the input parameter satisfies the qualification rules required by the invoking ADNA. After the exception ADNA 352 has obtained the updated input parameter, then the exception ADNA 352 may invoke the ADNA 324 with the updated input parameter.

Figure 3E:
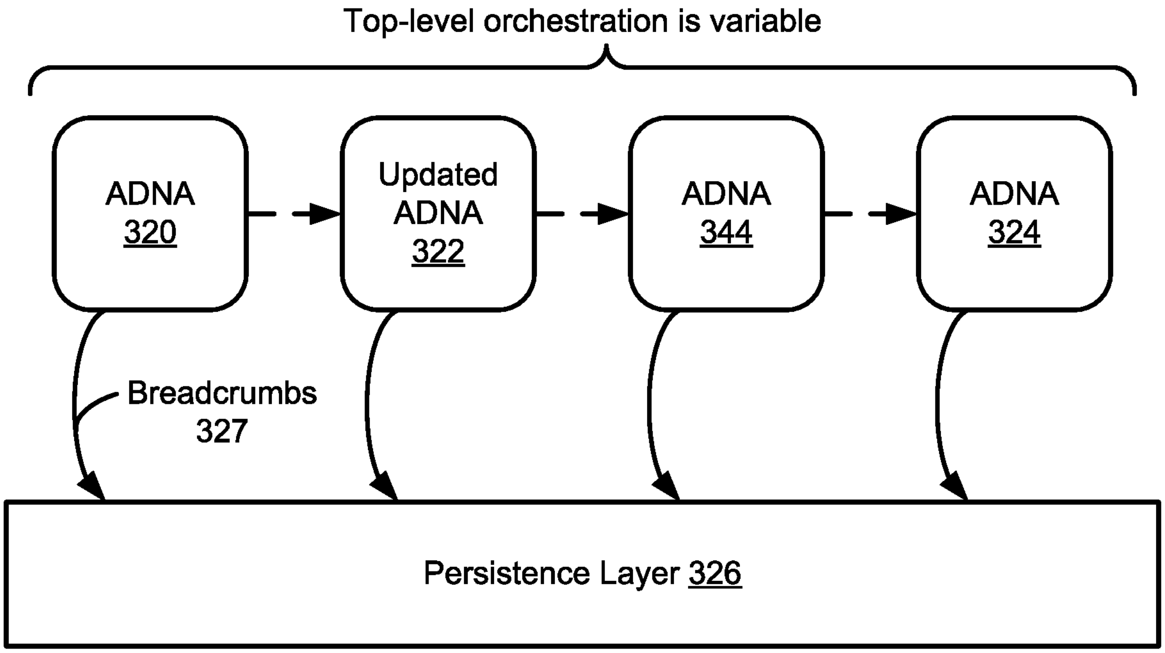
FIG. 3E depicts one embodiment of the process performed in FIG. 3B in which an ADNA has been updated to reference a new ADNA.

FIG. 3E depicts one embodiment of the process performed in FIG. 3B in which an ADNA has been updated to reference a new ADNA that has been added to a pool of ADNAs. As depicted, the ADNA 322 has been updated to reference the new ADNA 344 and the updated ADNA 322 now invokes ADNA 344. In one embodiment, the new ADNA 344 may be associated with a new hardware device or a new virtual device added to a system. In another embodiment, the new ADNA 344 may correspond with a newly instantiated virtualized network function. The new ADNA 344 may be automatically created and added to the pool of ADNAs in response to detection that the ADNA 322 had invoked the exception ADNA 352 more than a threshold number of times (e.g., more than ten times).

Figure 3F:
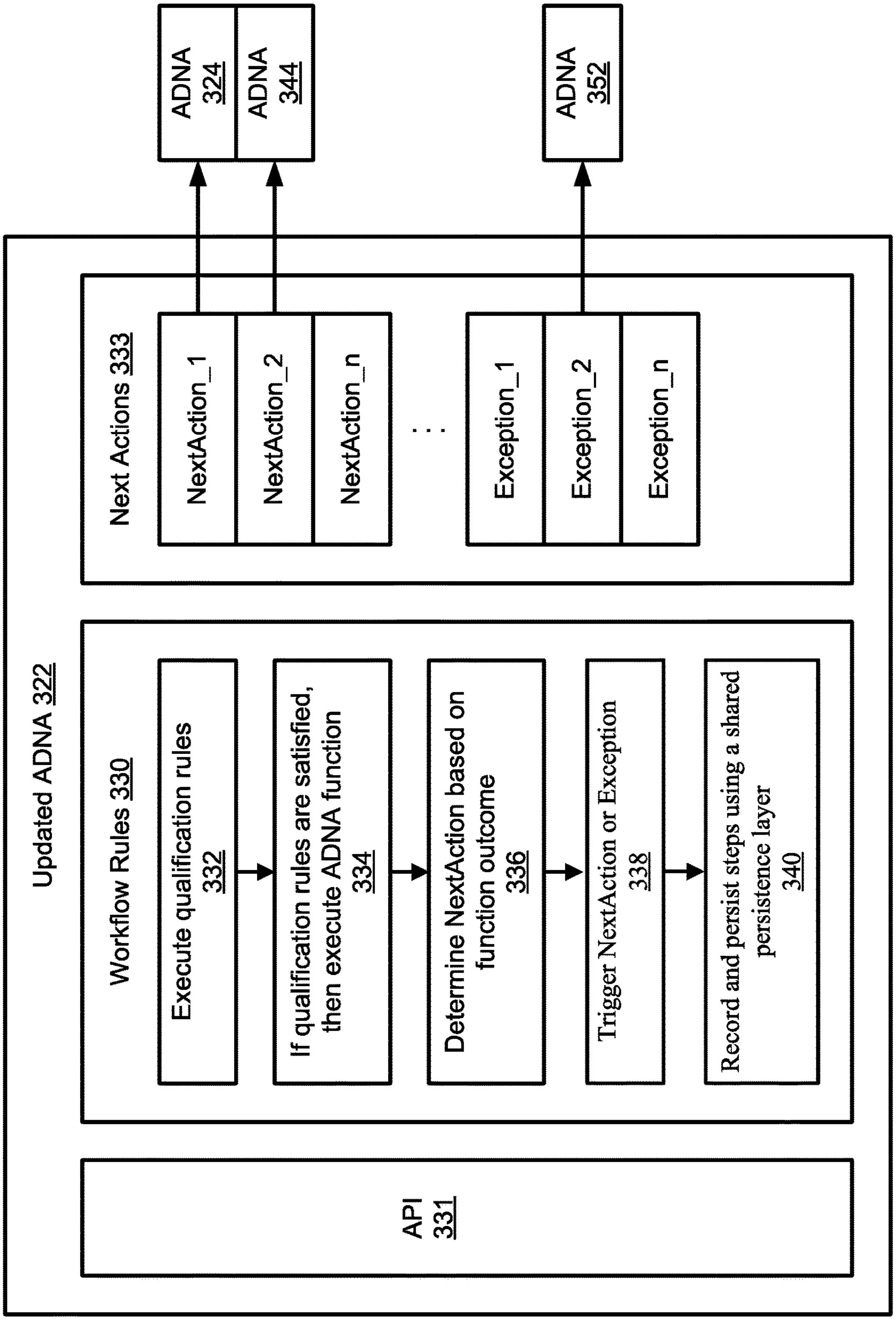
FIG. 3F depicts one embodiment of an updated ADNA.

FIG. 3F depicts one embodiment of an updated ADNA 322 in which the NextAction_2 mapping for the ADNA 322 of FIG. 3C has been changed to reference the new ADNA 344. FIG. 3E depicts the updated ADNA 322 invoking ADNA 344 as the next action ADNA.

Figure 3G:
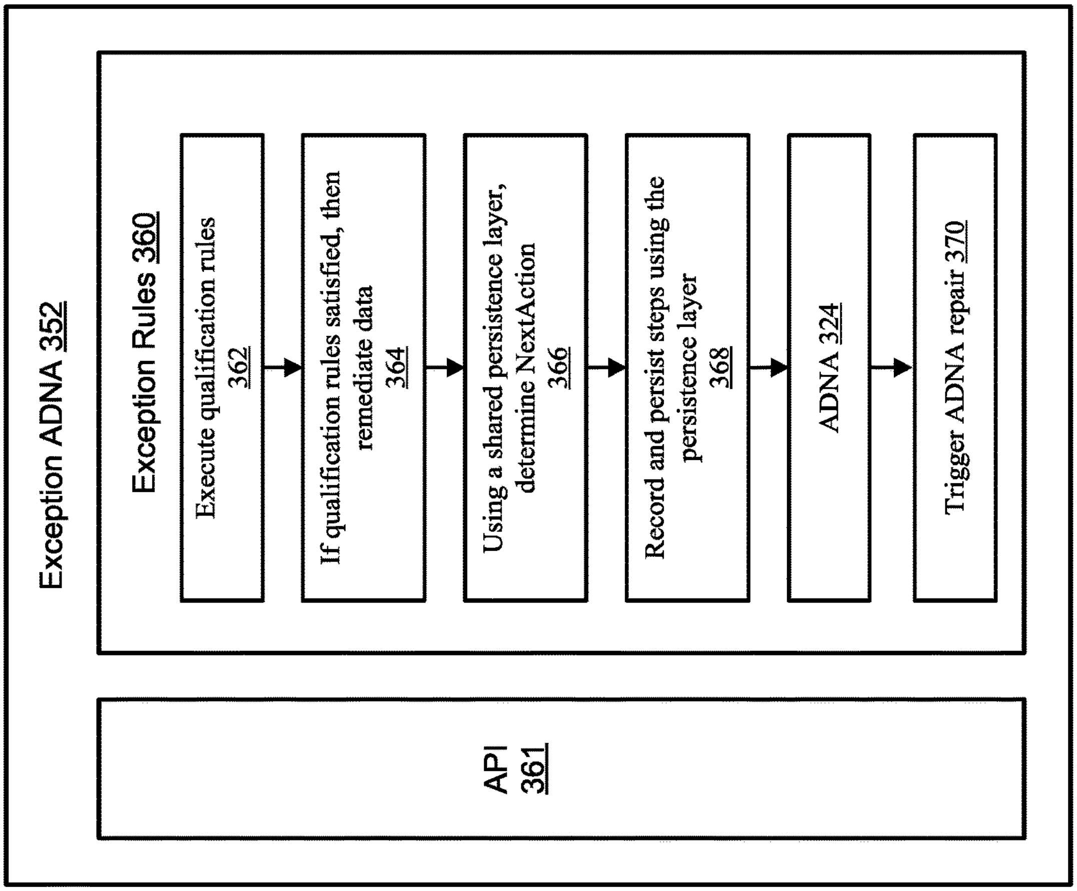
FIG. 3G depicts one embodiment of an exception ADNA.

FIG. 3G depicts one embodiment of an exception ADNA 352. The exception ADNA 352 includes an API 361 and exception rules 360. The API 361 may provide an interface for invoking the exception ADNA 352. The API 361 may require one or more input parameters of a particular data type (e.g., a character string or a floating point number). The exception rules 360 may include program code for one or more exception rules. The exception rules 360 may be executed to implement one or more specific tasks to be performed by the exception ADNA 352. In some cases, the exception ADNA 352 may acquire a set of input parameters from the API 361 and execute qualification rules to determine whether the set of input parameters satisfy the qualification rules. In one example, the qualification rules may require that each of the set of input parameters are of a particular type (e.g., a character string, an integer, or a floating-point number), that each of the set of input parameters are within a particular range (e.g., between a minimum and maximum value), and that at least a threshold number of input parameters have been passed to the exception ADNA 352 via the API 361. If the qualification rules are satisfied, then the exception ADNA 352 may identify the ADNA that invoked the exception ADNA 352 and determine an input parameter or function outcome responsible for causing the exception ADNA 352 to be invoked. The exception ADNA 352 may acquire breadcrumb information from a persistence layer to determine the input parameter or function outcome responsible for causing the exception ADNA 352 to be invoked. After the input parameter or function outcome is determined, then data associated with the input parameter or function outcome may be remediated. In one example, the data associated with the input parameter or function outcome may be reacquired from the original source of the data or may be acquired from a difference data source. After the data has been remediated, then a next action ADNA may be determined based on breadcrumb information stored within the persistence layer. The breadcrumb information may include an identification of the ADNA that invoked the exception ADNA 352.

A process specified by the exception rules 360 may be performed using one or more real machines, one or more virtual machines, and/or one or more containerized applications. In one embodiment, the process specified by the exception rules 360 may be performed using a containerized environment, such as the containerized environment 279 in FIG. 2E.

As depicted in FIG. 3G, in operation 362, qualification rules are applied to and executed to ensure that the input parameters received by the exception ADNA 352 via the API 361 are valid or within an acceptable range of values. In operation 364, it is determined whether the qualification rules for the input parameters have been satisfied and if the qualification rules have been satisfied, then additional processing is performed such as remediating data responsible for causing the exception ADNA 352 to be invoked. In operation 366, a subsequent ADNA (or a next action ADNA) is determined based on an identification of the ADNA that invoked the exception ADNA 352. In operation 368, breadcrumb information including an identification of the exception ADNA 352, input parameters passed to the exception ADNA 352, and an identification of the data remediated by the exception ADNA 352 may be stored using a shared persistence layer. In operation 324, next action ADNA may be invoked. In operation 370, a repair ADNA may be invoked if the exception ADNA 352 has been invoked more than a threshold number of times by a particular ADNA in order to repair the ADNA that invoked the exception ADNA 352.

In some embodiments, a machine learning engine may access the shared persistence layer, such as the persistence layer 326 in FIG. 3D, to identify a set of ADNAs to be repaired. As an example, the set of ADNAs to be repaired may comprise the top one hundred ADNAs that invoked the greatest number of exception ADNAs.

At least one embodiment of the disclosed technology includes one or more processors configured to identify a first atomic deterministic next action task block out of a pool of atomic deterministic next action task blocks associated with a workflow process, acquire a set of input parameters for the first atomic deterministic next action task block, detect that a first input parameter of the set of input parameters does not satisfy a qualification rule for the first atomic deterministic next action task block, identify an exception atomic deterministic next action task block in response to detection that the first input parameter does not satisfy the qualification rule, store breadcrumb information for the first atomic deterministic next action task block within a persistence layer prior to the exception atomic deterministic next action task block being invoked, and invoke the exception atomic deterministic next action task block.

At least one embodiment of the disclosed technology includes identifying a first atomic deterministic next action task block out of a pool of atomic deterministic next action task blocks, determining a set of input parameters for the first atomic deterministic next action task block, detecting that a first input parameter of the set of input parameters does not satisfy a qualification rule for the first atomic deterministic next action task block, identifying an exception atomic deterministic next action task block out of the pool of atomic deterministic next action task blocks in response to detection that the first input parameter does not satisfy the qualification rule, storing breadcrumb information for the first atomic deterministic next action task block within a persistence layer prior to the exception atomic deterministic next action task block being invoked, and invoking the exception atomic deterministic next action task block.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each operation in a flowchart may correspond with a program module or portion of computer program code, which may comprise one or more computer-executable instructions for implementing the specified functionality. In some implementations, the functionality noted within an operation may occur out of the order noted in the figures. For example, two operations shown in succession may, in fact, be executed substantially concurrently, or the operations may sometimes be executed in the reverse order, depending upon the functionality involved. In some implementations, operations may be omitted and other operations added without departing from the spirit and scope of the present subject matter. In some implementations, the functionality noted within an operation may be implemented using hardware, software, or a combination of hardware and software. As examples, the hardware may include microcontrollers, microprocessors, field programmable gate arrays (FPGAs), and electronic circuitry.

For purposes of this document, the term "processor" may refer to a real hardware processor or a virtual processor, unless expressly stated otherwise. A virtual machine may include one or more virtual devices, such as a virtual processor and a virtual memory in communication with the virtual processor.

For purposes of this document, it should be noted that the dimensions of the various features depicted in the figures may not necessarily be drawn to scale.

For purposes of this document, reference in the specification to "an embodiment," "one embodiment," "some embodiments," "another embodiment," and other variations thereof may be used to describe various features, functions, or structures that are included in at least one or more embodiments and do not necessarily refer to the same embodiment unless the context clearly dictates otherwise.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify or distinguish separate objects.

For purposes of this document, the term "set" of objects may refer to a "set" of one or more of the objects.

For purposes of this document, the term "or" should be interpreted in the conjunctive and the disjunctive. A list of items linked with the conjunction "or" should not be read as requiring mutual exclusivity among the items, but rather should be read as "and/or" unless expressly stated otherwise. The terms "at least one," "one or more," and "and/or," as used herein, are open-ended expressions that are both conjunctive and disjunctive in operation. The phrase "A and/or B" covers embodiments having element A alone, element B alone, or elements A and B taken together. The phrase "at least one of A, B, and C" covers embodiments having element A alone, element B alone, element C alone, elements A and B together, elements A and C together, elements B and C together, or elements A, B, and C together. The indefinite articles "a" and "an," as used herein, should typically be interpreted to mean "at least one" or "one or more," unless expressly stated otherwise.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system including a dynamically scalable atomic deterministic next action (ADNA) manager comprising:
- one or more processors configured to:
  - execute one or more workflow rules using ADNA task blocks, wherein the ADNA task blocks and the one or more workflow rules are associated with a workflow process;
  - invoke the ADNA task blocks;
  - execute the one or more workflow rules for a first ADNA task block in the ADNA task blocks;
  - execute a qualification rule on a set of input parameters for the first ADNA task block;
  - when a first input parameter of the set of input parameters does not satisfy the qualification rule for the first ADNA task block, store breadcrumb information for the first ADNA task block within a persistence layer associated with the system prior to an exception ADNA task block being invoked, wherein the exception ADNA task block is associated with a mapping table and the mapping table is associated with the system; and
  - invoke, via the dynamically scalable ADNA manager, the exception ADNA task block.

2. The system of claim 1, wherein the one or more processors are further configured to:
- invoke the first ADNA task block from the exception ADNA task block with an updated input parameter for the first input parameter.

3. The system of claim 2, wherein the one or more processors are further configured to:
- store additional breadcrumb information for the exception ADNA task block within the persistence layer prior to the first ADNA task block being invoked.

4. The system of claim 1, wherein the breadcrumb information for the first ADNA task block includes a timestamp for when the first ADNA task block invoked the exception ADNA task block.

5. The system of claim 1, wherein the breadcrumb information for the first ADNA task block includes an identification of the first ADNA task block and an identification of the exception ADNA task block.

6. The system of claim 1, wherein
- the one or more processors are further configured to:
  - invoke the first ADNA task block from the exception ADNA task block with a remediated first input parameter.

7. The system of claim 1, wherein the one or more processors are further configured to:

update the first ADNA task block with a new workflow rule in response to the first ADNA task block invoking the exception ADNA task block at least a threshold number of times.

8. The system of claim 1, wherein the one or more processors are further configured to:

add a new ADNA task block to the ADNA task blocks in response to the first ADNA task block invoking the exception ADNA task block at least a threshold number of times.

9. The system of claim 1, wherein each input parameter of the set of input parameters satisfies one or more qualification rules.

10. The system of claim 9, wherein the one or more processors are further configured to:

invoke a second ADNA task block based on the one or more workflow rules, wherein the persistence layer comprises non-volatile data storage.

11. A method executed by one or more processors of a dynamically scalable atomic deterministic next action (ADNA) manager, the method comprising:

executing one or more workflow rules using ADNA task blocks to, wherein the ADNA task blocks and the one or more workflow rules are associated with a workflow process;

invoking the ADNA task blocks;

executing the one or more workflow rules for a first ADNA task block in the ADNA task blocks;

executing a qualification rule on a set of input parameters for the first ADNA task block;

when a first input parameter of the set of input parameters does not satisfy the qualification rule for the first ADNA task block, storing breadcrumb information for the first ADNA task block within a persistence layer associated with the dynamically scalable ADNA manager prior to an exception ADNA task block being invoked, wherein the exception ADNA task block is associated with a mapping table and the mapping table is associated with the dynamically scalable ADNA manager; and invoking, via the dynamically scalable ADNA manager, the exception ADNA task block.

12. The method of claim 11, further comprising:

invoking the first ADNA task block from the exception ADNA task block with an updated input parameter for the first input parameter.

13. The method of claim 12, further comprising:

storing additional breadcrumb information for the exception ADNA task block within the persistence layer prior to the first ADNA task block being invoked.

14. The method of claim 11, wherein the breadcrumb information for the first ADNA task block includes a timestamp for when the first ADNA task block invoked the exception ADNA task block.

15. The method of claim 11, wherein the breadcrumb information for the first ADNA task block includes an identification of the first ADNA task block and an identification of the exception ADNA task block.

16. The method of claim 11, further comprising:

invoking the first ADNA task block from the exception ADNA task block with a remediated first input parameter.

17. The method of claim 11, further comprising:

updating the first ADNA task block with a new workflow rule in response to the first ADNA task block invoking the exception ADNA task block at least a threshold number of times.

18. One or more storage devices containing one or more processors of a dynamically scalable atomic deterministic next action (ADNA) manager and processor readable code for configuring the one or more processors to perform a method comprising:

execute one or more workflow rules using ADNA task blocks, wherein the ADNA task blocks and the one or more workflow rules are associated with a workflow process;

invoking the ADNA task blocks;

executing the one or more workflow rules for a first ADNA task block in the ADNA task blocks;

executing a qualification rule on a set of input parameters for the first ADNA task block;

when a first input parameter of the set of input parameters does not satisfy the qualification rule for the first ADNA task block, storing breadcrumb information for the first ADNA task block within a persistence layer associated with the dynamically scalable ADNA manager prior to an exception ADNA task block being invoked, wherein the exception ADNA task block is associated with a mapping table and the mapping table is associated with the dynamically scalable ADNA manager; and invoking, via the dynamically scalable ADNA manager, the exception ADNA task block.

19. The one or more storage devices of claim 18, wherein the one or more processors are further configured to perform:

invoking the first ADNA task block from the exception ADNA task block with an updated input parameter for the first input parameter.

20. The one or more storage devices of claim 18, wherein the breadcrumb information for the first ADNA task block includes a timestamp for when the first ADNA task block invoked the exception ADNA task block, and the persistence layer comprises non-volatile data storage.

* * * * *